(12) United States Patent
Wang et al.

(10) Patent No.: US 12,541,831 B2
(45) Date of Patent: Feb. 3, 2026

(54) TONE MAPPING METHOD AND APPARATUS

(71) Applicant: HUAWEI TECHNOLOGIES CO., LTD., Guangdong (CN)

(72) Inventors: Yichuan Wang, Beijing (CN); Quanhe Yu, Beijing (CN); Weiwei Xu, Hangzhou (CN); Hu Chen, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 254 days.

(21) Appl. No.: 18/336,837

(22) Filed: Jun. 16, 2023

(65) Prior Publication Data

US 2023/0325987 A1     Oct. 12, 2023

Related U.S. Application Data

(63) Continuation of application No. PCT/CN2021/124438, filed on Oct. 18, 2021.

(30) Foreign Application Priority Data

Dec. 17, 2020    (CN) .......................... 202011492320.5

(51) Int. Cl.
    *G06T 5/92* (2024.01)
    *G06T 7/90* (2017.01)
    *H04N 9/64* (2023.01)

(52) U.S. Cl.
    CPC .................. *G06T 5/92* (2024.01); *G06T 7/90* (2017.01); *H04N 9/64* (2013.01); *G06T 2207/10024* (2013.01); *G06T 2207/20208* (2013.01)

(58) Field of Classification Search
    CPC ... G06T 5/92; G06T 7/90; G06T 2207/10024; G06T 2207/20208; G06T 5/90; H04N 9/64; H04N 9/77; H04N 9/643
    See application file for complete search history.

(56) References Cited

U.S. PATENT DOCUMENTS

2015/0002904 A1    1/2015   Nakamura
2017/0186141 A1*   6/2017   Ha ........................... H04N 9/67
(Continued)

FOREIGN PATENT DOCUMENTS

CN      111127365 A       5/2020
TW      201835861 A      10/2018
WO      2018152063    *   8/2018

OTHER PUBLICATIONS

Report ITU-R BT.2408-0 (Oct. 2017), BT Series Broadcasting service (television), 19 pages.
(Continued)

*Primary Examiner* — Phuoc Tran

(57) ABSTRACT

Tone mapping methods and apparatus provide for receipt by a backend device may of metadata and an HDR image from a frontend device and the generation of a mapping curve based on feature parameters of the mapping curve included in the metadata. Tone mapping on the HDR image can be performed based on the mapping curve. The feature parameters of the mapping curve are determined by the frontend device based on a luminance distribution status of the HDR image. In this way, the mapping curve parameters are determined based on the luminance distribution status of the HDR image so that design of the mapping curve is more flexible, and display effect of the HDR image can be effectively improved.

16 Claims, 9 Drawing Sheets

(56) References Cited

U.S. PATENT DOCUMENTS

| | | | |
|---|---|---|---|
| 2017/0251161 A1* | 8/2017 | Toma | G11B 20/10 |
| 2020/0134792 A1* | 4/2020 | Mandal | G06T 5/92 |
| 2022/0044615 A1* | 2/2022 | Pytlarz | G09G 3/2007 |
| 2022/0051377 A1* | 2/2022 | Tao | H04N 19/00 |
| 2022/0164929 A1* | 5/2022 | Liu | G06T 5/92 |

OTHER PUBLICATIONS

SMPTE ST 2094-10:2016, SMPTE Standard, 15 pages.
SMPTE ST 2094-40:2016, SMPTE Standard, 26 pages.
Cvetkovic, S. D., Tone-mapping functions and multiple-exposure techniques for high dynamic-range images, Jan. 1, 2009, total 9 pages.

* cited by examiner

TONE MAPPING METHOD AND APPARATUS

CROSS-REFERENCE TO RELATED APPLICATIONS

This application is a continuation of International Application No. PCT/CN2021/124438 filed on Oct. 18, 2021, which claims priority to Chinese Patent Application No. 202011492320.5 filed on Dec. 17, 2020. The disclosures of the aforementioned applications are hereby incorporated by reference in their entireties.

TECHNICAL FIELD

This disclosure relates to the field of display technologies, and in particular, to a tone mapping method and apparatus.

BACKGROUND

A high dynamic range (HDR) video technology expands a luminance range of an image that can be displayed, so that information in a large luminance range can be recorded, and more details in bright and dark regions in the image can be presented.

However, luminance of an HDR video or image generally does not match a luminance range that can be displayed by a standard dynamic range (SDR) display device or a large quantity of other existing HDR display devices. For example, in a frame of HDR image, pixel luminance of the darkest part is 0.4 cd/m2, and pixel luminance of the brightest part is 6000 cd/m2. However, because a television can display only pixels whose luminance is greater than or equal to 0.5 cd/m2 and less than or equal to 5000 cd/m2, pixels whose luminance ranges from 0.4 cd/m2 to 0.5 cd/m2 in the frame of image presents darkness on the television, and pixels whose luminance ranges from 5000 cd/m2 to 6000 cd/m2 in the frame of image presents a white light on the television.

Therefore, when the HDR video or image is displayed on an existing display device, luminance of the HDR video or image needs to be processed based on a display capability of the display device to obtain an SDR video or image, so that the HDR video or image matches a luminance range that can be displayed by the display device. A process of compressing the HDR video or image to the SDR video or image is referred to as tone mapping (TM).

It is proposed in the industry to perform tone mapping on the HDR image based on a mapping curve determined by using an N-power spline function. However, generation of the mapping curve depends on a basic curve (for example, a Bezier curve), and consequently, generation of the entire mapping curve is not flexible enough. Tone mapping effect on pixels in an extra bright region or an extra dark region is poor, and consequently, display effect of the HDR image is poor.

SUMMARY

This disclosure provides a tone mapping method and apparatus, to perform tone mapping on an HDR image, so as to improve display effect of the HDR image.

According to a first aspect, an embodiment provides a tone mapping method. The method includes receiving at least one frame of image and metadata, where the metadata includes mapping curve parameters such as a quantity M of mapping curves and coordinates of a start node and an end node of each mapping curve in a first coordinate system, and then generating the M mapping curves based on the metadata. Tone mapping is performed on the at least one frame of image based on the M mapping curves.

It should be understood that each mapping curve is an N-power spline curve, a horizontal coordinate of the first coordinate system indicates image luminance before tone mapping, a vertical coordinate of the first coordinate system indicates image luminance after tone mapping, M is an integer greater than or equal to 1, and N is an integer greater than or equal to 3.

In this embodiment, after the metadata is received, the M N-power spline curves may be generated based on the quantity M of mapping curves in the metadata and the coordinates of the start node and the end node of each mapping curve in the first coordinate system in the metadata, and tone mapping is performed on at least one frame of image based on the M N-power spline curves. In this embodiment of this application, design of the mapping curve is more flexible, and tone mapping effect of an HDR image can be effectively improved, thereby effectively improving display effect of the HDR image.

In a possible implementation, the metadata may further include a preset first derivative of the start node and a preset first derivative of the end node of each mapping curve.

In this implementation, the metadata includes the preset first derivative of the start node and the preset first derivative of the end node of each mapping curve, so that a manner of generating each mapping curve is more flexible.

In a possible implementation, each of the at least one frame of image corresponds to at least one luminance range, each luminance range corresponds to at least one mapping curve, a function expression corresponding to each mapping curve may be an N-power polynomial, the N-power polynomial includes N+1 monomials, and each monomial corresponds to one coefficient.

In this implementation, each of the at least one frame of image includes one or more luminance ranges, and a corresponding mapping curve may be designed for each luminance range. Therefore, tone mapping effect of the at least one frame of image can be effectively improved, thereby effectively improving display effect of the at least one frame of image.

For example, an $i^{th}$ mapping curve in the at least one mapping curve may be a cubic spline function curve, and a corresponding first function expression corresponding to the $i^{th}$ mapping curve is:

$$y=di*(x-x2)^3+ci*(x-x2)^2+bi*(x-x2)+ai, \text{ where}$$

x is an independent variable and is used to represent the image luminance before tone mapping, y is a dependent variable and is used to represent the image luminance after tone mapping, ai is a first coefficient of a constant term in the $i^{th}$ mapping curve, bi is a second coefficient of a linear monomial in the $i^{th}$ mapping curve, ci is a third coefficient of a quartic monomial in the $i^{th}$ mapping curve, di is a fourth coefficient of a cubic monomial in the $i^{th}$ mapping curve, x2 is a horizontal coordinate of a start node of the $i^{th}$ mapping curve, and none of ai, bi, ci, and di is 0.

For example, the $i^{th}$ mapping curve may alternatively be a quartic spline function curve, and a first function expression corresponding to the $i^{th}$ mapping curve is:

$$y=ei*(x-x2)^4+di*(x-x2)^3+ci*(x-x2)^2+bi*(x-x2)+ai, \text{ where}$$

x is an independent variable and is used to represent the image luminance before tone mapping, y is a dependent variable and is used to represent the image luminance after tone mapping, ai is a coefficient of a constant term in the $i^{th}$ mapping curve, bi is a coefficient of a linear monomial in the $i^{th}$ mapping curve, ci is a coefficient of a quartic monomial in the $i^{th}$ mapping curve, di is a coefficient of a cubic monomial in the $i^{th}$ mapping curve, ei is a coefficient of a quartic monomial in the $i^{th}$ mapping curve, x2 is a horizontal coordinate of a start node of the $i^{th}$ mapping curve, and none of ai, bi, ci, and di is 0.

It should be understood that the cubic spline function curve and the quartic spline function curve are merely used as examples instead of limitations. A specific type of the spline function curve is not limited in this embodiment of this application. For example, the $i^{th}$ mapping curve may alternatively be a quintic spline function curve, a sextic spline function curve, or the like.

In a possible implementation, a first luminance range in the at least one luminance range corresponds to a first mapping curve, and the first mapping curve includes a first start node and a first end node. Correspondingly, the generating the M mapping curves based on the metadata may include: substituting coordinates of the first start node into a first function expression to obtain a first coefficient a1 of the first mapping curve; substituting coordinates of the first end node into the first function expression to obtain a first equation; enabling a first derivative of the first mapping curve at the first start node to be equal to a preset first derivative of the first start node to obtain a second equation; enabling a first derivative of the first mapping curve at the first end node to be equal to a preset first derivative of the first end node to obtain a third equation; combining the first equation, the second equation, and the third equation to obtain a first system of equations; parsing the first system of equations to obtain a second coefficient b1, a third coefficient c1, and a fourth coefficient d1 of the first mapping curve; and generating the first mapping curve based on the first coefficient a1, the second coefficient b1, the third coefficient c1, and the fourth coefficient d1 of the first mapping curve.

In this implementation, for a same luminance range, one N-power spline curve is used to form a mapping curve, and a few mapping curve parameters are required, thereby improving metadata transmission efficiency.

In a possible implementation, a second luminance range in the at least one luminance range corresponds to a second mapping curve and a third mapping curve, the second mapping curve corresponds to a first luminance sub-range in the second luminance range, and the third mapping curve corresponds to a second luminance sub-range in the second luminance range. A maximum value in the first luminance sub-range is equal to a minimum value in the second luminance sub-range. The second mapping curve includes a second start node and a second end node. The third mapping curve includes a third start node and a third end node. Coordinates of the second end node are the same as coordinates of the third start node. Correspondingly, the generating the M mapping curves based on the metadata may include: substituting coordinates of the second start node into a first function expression to obtain a first coefficient a2 of the second mapping curve; substituting coordinates of the third start node into a first function expression to obtain a first coefficient a3 of the third mapping curve; enabling a first derivative of the second mapping curve at the second start node to be equal to a preset first derivative of the second start node to establish a fourth equation; analyzing the fourth equation to obtain a second coefficient b2 of the second mapping curve; constructing a second system of equations based on the coordinates of the second end node, coordinates of the third end node, and a preset first derivative of the third end node; parsing the second system of equations to obtain a third coefficient c2 and a fourth coefficient d2 of the second mapping curve, and a second coefficient b3, a third coefficient c3, and a fourth coefficient d3 of the third mapping curve; generating the second mapping curve based on the first coefficient a2, the second coefficient b2, the third coefficient c2, and the fourth coefficient d2 of the second mapping curve; and generating the third mapping curve based on the first coefficient a3, the second coefficient b3, the third coefficient c3, and the fourth coefficient d3 of the third mapping curve.

In this implementation, a same luminance range is further divided into two luminance sub-ranges, and each luminance sub-range corresponds to one N-power spline curve. In other words, two N-power spline curves are used to form mapping curves in a same luminance range, thereby effectively improving flexibility of mapping curve design, and further effectively improving tone mapping effect.

There are a plurality of implementations of constructing the second system of equations based on the coordinates of the second end node, the coordinates of the third end node, and the preset first derivative of the third end node. This is not limited in this embodiment of this application.

For example, in Manner 1, the coordinates of the second end node and the coordinates of the third end node are substituted into the first function expression to obtain a fifth equation and a sixth equation respectively. A first derivative of the third end node on the third mapping curve is enabled to be equal to the preset first derivative of the third end node to obtain a seventh equation. A first derivative of the second mapping curve at the second end node is enabled to be equal to a first derivative of the third mapping curve at the third start node to obtain an eighth equation. A second derivative of the second mapping curve at the second end node is enabled to be equal to a second derivative of the third mapping curve at the third start node to obtain a ninth equation. The fifth equation, the sixth equation, the seventh equation, the eighth equation, and the ninth equation are combined to obtain the second system of equations.

In Manner 1, the first derivative of the second mapping curve at the second end node is enabled to be equal to the first derivative of the third mapping curve at the third start node, and the second derivative of the second mapping curve at the second end node is enabled to be equal to the second derivative of the third mapping curve at the third start node, to solve function coefficients of the mapping curves. Therefore, the metadata does not need to carry preset first derivatives of the second end node and the third start node. This can effectively improve metadata transmission efficiency.

For example, in Manner 2, the coordinates of the second end node and the coordinates of the third end node are substituted into the first function expression to obtain a fifth equation and a sixth equation respectively. A first derivative of the third end node on the third mapping curve is enabled to be equal to the preset first derivative of the third end node to obtain a seventh equation. A first derivative of the second mapping curve at the second end node is enabled to be equal to a preset first derivative of the second end node to obtain an eighth equation. A first derivative of the third mapping curve at the third start node is enabled to be equal to a preset first derivative of the third start node to obtain a ninth equation. The fifth equation, the sixth equation, the seventh equation, the eighth equation, and the ninth equation are combined to obtain the second system of equations.

In Manner 2, the first derivative of the second mapping curve at the second end node is enabled to be equal to the preset first derivative of the second end node, and the first derivative of the third mapping curve at the third start node is enabled to be equal to the preset first derivative of the third start node, to solve function coefficients of the mapping curves. This can effectively reduce a calculation amount.

In a possible implementation, the performing tone mapping on the at least one frame of image based on the M mapping curves may include: performing tone mapping on each pixel in the at least one frame of image by using a mapping curve corresponding to a luminance range of the pixel.

In this implementation, tone mapping is performed on pixels in different luminance ranges in the at least one frame of image by using different mapping curves, so that display of the at least one frame of image can be more adapted to a display device, thereby effectively improving the display effect of the at least one frame of image.

In a possible implementation, after the performing tone mapping on the at least one frame of image based on the M mapping curves, the method may further include: correcting, based on luminance information of each pixel in the at least one frame of image before and after tone mapping, color information of at least one frame of image obtained through mapping.

In this implementation, after performing the tone mapping on the at least one frame of image, a backend device further adjusts the color information of the at least one frame of image based on the luminance information of each pixel in the at least one frame of image before and after tone mapping, so that the display effect of the at least one frame of image can be further improved.

According to a second aspect, an embodiment provides a metadata generation method. The method includes: obtaining at least one frame of image, and then processing the at least one frame of image to generate metadata. The metadata includes a quantity M of mapping curves and coordinates of a start node and an end node of each mapping curve in a first coordinate system.

It should be understood that the mapping curve is an N-power spline curve, a horizontal coordinate of the first coordinate system indicates image luminance before tone mapping, a vertical coordinate of the first coordinate system indicates image luminance after tone mapping, M is an integer greater than or equal to 1, and N is an integer greater than or equal to 3.

In this embodiment, the metadata including mapping curve parameters is generated based on the at least one frame of image, and image content matching provides a high degree of freedom for design of the mapping curve, thereby effectively improving effect of performing tone mapping on the image.

In a possible implementation, the processing the at least one frame of image to generate metadata may include: extracting attribute information of the at least one frame of image, where the attribute information may include a maximum value, a minimum value, an average value, a change range, and the like of luminance; and then determining the metadata based on the attribute information.

In this implementation, the metadata is determined based on the maximum value, the minimum value, the average value, the change range, and the like of the luminance of the at least one frame of image, and the mapping curve parameters are combined with an image luminance characteristic, so that flexibility of mapping curve design can be effectively improved, and effect of performing tone mapping on the image can be effectively improved.

In a possible implementation, when the metadata includes the quantity M of mapping curves, the determining the metadata based on the attribute information includes: determining a luminance distribution status of the at least one frame of image based on the attribute information; dividing the luminance of at least one frame of image into at least one luminance range based on the luminance distribution status; and determining the quantity M based on a quantity F of luminance ranges, where M is greater than or equal to F, and each luminance range corresponds to at least one mapping curve.

In this implementation, different mapping curves are designed for different luminance ranges, so that flexibility of mapping curve design can be further improved.

In a possible implementation, when the metadata includes the coordinates of the end node and the start node of each mapping curve in the first coordinate system, the determining the metadata based on the attribute information may include: determining the coordinates of the start node and the end node of each mapping curve in the first coordinate system based on the luminance distribution status and a maximum luminance value that can be displayed by a backend device.

For example, a horizontal coordinate of an end node of a mapping curve corresponding to a first image in the first coordinate system may be determined based on a luminance distribution status of the first image, and a vertical coordinate of the end node of the mapping curve in the first coordinate system may be determined based on the maximum luminance value that can be displayed by the backend device.

In this implementation, parameters of each mapping curve are determined based on the luminance distribution status of the image and the maximum luminance value that can be displayed by the backend device, so that flexibility of mapping curve design can be further improved.

In a possible implementation, the metadata may further include a preset first derivative of the start node and a preset first derivative of the end node.

In this implementation, the metadata carries the preset first derivative of the start node and the preset first derivative of the end node of each mapping curve, so that a manner of generating the mapping curve is more flexible.

In a possible implementation, when the metadata includes the preset first derivative of the end node and the preset first derivative of the start node of each mapping curve, the determining the metadata based on the attribute information may include: determining the preset first derivative of the start node and the preset first derivative of the end node based on a balance requirement between the luminance and contrast of the at least one frame of image.

In this implementation, the preset first derivative of the start node and the preset first derivative of the end node are determined based on the balance requirement between the luminance and the contrast of the at least one frame of image, so that flexibility of mapping curve design can be further effectively improved, to meet diversified mapping requirements of a user, thereby effectively improving user experience.

In a possible implementation, after the processing the at least one frame of image to generate metadata, the method may further include: performing a first operation to change at least one of the quantity M, the coordinates of the start node in the first coordinate system, the coordinates of the end node in the first coordinate system, the preset first derivative of the start node, or the preset first derivative of the end node; and modifying the metadata based on the first operation to obtain updated metadata.

In this implementation, the user may modify the parameters of the mapping curve in the metadata, so that the diversified mapping requirements of the user can be further met, thereby effectively improving user experience.

According to a third aspect, an embodiment provides a tone mapping processing apparatus. The apparatus includes modules configured to perform the method in any one of the first aspect or the possible implementations of the first aspect.

For example, the apparatus may include:

a receiving module, configured to receive at least one frame of image and metadata, where the metadata includes a quantity M of mapping curves and coordinates of a start node and an end node of each mapping curve in a first coordinate system, the mapping curve is an N-power spline curve, a horizontal coordinate of the first coordinate system indicates image luminance before tone mapping, a vertical coordinate of the first coordinate system indicates image luminance after tone mapping, M is an integer greater than or equal to 1, and N is an integer greater than or equal to 3; and a processing module, configured to: generate the M mapping curves based on the metadata; and perform tone mapping on the at least one frame of image based on the M mapping curves.

In a possible implementation, the metadata further includes a preset first derivative of the start node and a preset first derivative of the end node of each mapping curve.

In a possible implementation, each of the at least one frame of image corresponds to at least one luminance range, each luminance range corresponds to at least one mapping curve, a function expression corresponding to each mapping curve is an N-power polynomial, the N-power polynomial includes N+1 monomials, and each monomial corresponds to one coefficient.

For example, an $i^{th}$ mapping curve in the at least one mapping curve may be a cubic spline function curve, and a corresponding first function expression corresponding to the $i^{th}$ mapping curve is:

$$y=di*(x-x2)^3+ci*(x-x2)^2+bi*(x-x2)+ai, \text{ where}$$

x is an independent variable and is used to represent the image luminance before tone mapping, y is a dependent variable and is used to represent the image luminance after tone mapping, ai is a first coefficient of a constant term in the $i^{th}$ mapping curve, bi is a second coefficient of a linear monomial in the $i^{th}$ mapping curve, ci is a third coefficient of a quartic monomial in the $i^{th}$ mapping curve, di is a fourth coefficient of a cubic monomial in the $i^{th}$ mapping curve, x2 is a horizontal coordinate of a start node of the $i^{th}$ mapping curve, and none of ai, bi, ci, and di is 0.

For example, the $i^{th}$ mapping curve may alternatively be a quartic spline function curve, and a first function expression corresponding to the $i^{th}$ mapping curve is:

$$y=ei*(x-x2)^4+di*(x-x2)^3+ci*(x-x2)^2+bi*(x-x2)+ai,$$
where x is an independent variable and is used to represent the image luminance before tone mapping, y is a dependent variable and is used to represent the image luminance after tone mapping, ai is a coefficient of a constant term in the $i^{th}$ mapping curve, bi is a coefficient of a linear monomial in the $i^{th}$ mapping curve, ci is a coefficient of a quartic monomial in the $i^{th}$ mapping curve, di is a coefficient of a cubic monomial in the $i^{th}$ mapping curve, ei is a coefficient of a quartic monomial in the $i^{th}$ mapping curve, x2 is a horizontal coordinate of a start node of the $i^{th}$ mapping curve, and none of ai, bi, ci, and di is 0.

It should be understood that the $i^{th}$ mapping curve may be a cubic spline function curve, a quartic spline function curve, a quintic spline function curve, or the like. The cubic spline function curve and the quartic spline function curve are merely used as examples. This is not specifically limited in this embodiment.

In a possible implementation, a first luminance range in the at least one luminance range corresponds to a first mapping curve, and the first mapping curve includes a first start node and a first end node. When being configured to generate the M mapping curves based on the metadata, the processing module is specifically configured to:

substitute coordinates of the first start node into a first function expression to obtain a first coefficient a1 of the first mapping curve; substitute coordinates of the first end node into the first function expression to obtain a first equation; enable a first derivative of the first mapping curve at the first start node to be equal to a preset first derivative of the first start node to obtain a second equation; enable a first derivative of the first mapping curve at the first end node to be equal to a preset first derivative of the first end node to obtain a third equation; combine the first equation, the second equation, and the third equation to obtain a first system of equations; parse the first system of equations to obtain a second coefficient b1, a third coefficient c1, and a fourth coefficient d1 of the first mapping curve; and generate the first mapping curve based on the first coefficient a1, the second coefficient b1, the third coefficient c1, and the fourth coefficient d1 of the first mapping curve.

In a possible implementation, a second luminance range in the at least one luminance range corresponds to a second mapping curve and a third mapping curve, the second mapping curve corresponds to a first luminance sub-range in the second luminance range, and the third mapping curve corresponds to a second luminance sub-range in the second luminance range. A maximum value in the first luminance sub-range is equal to a minimum value in the second luminance sub-range. The second mapping curve includes a second start node and a second end node. The third mapping curve includes a third start node and a third end node. Coordinates of the second end node are the same as coordinates of the third start node. When being configured to generate the M mapping curves based on the metadata, the processing module is configured to:

substitute coordinates of the second start node into a first function expression to obtain a first coefficient a2 of the second mapping curve; substitute coordinates of the third start node into a first function expression to obtain a first coefficient a3 of the third mapping curve; enable a first derivative of the second mapping curve at the second start node to be equal to a preset first derivative of the second start node to establish a fourth equation; analyze the fourth equation to obtain a second coefficient b2 of the second mapping curve; construct a second system of equations based on the coordinates of the second end node, coordinates of the third end node, and a preset first derivative of the third end node; parse the second system of equations to obtain a third coefficient c2 and a fourth coefficient d2 of the second mapping curve, and a second coefficient b3, a third coefficient c3, and a fourth coefficient d3 of the third mapping curve; generate the second mapping curve based on the first coefficient a2, the second coefficient b2, the third coefficient c2, and the fourth coefficient d2 of the second mapping curve; and generate the third mapping curve based on the first coefficient a3, the second coefficient b3, the third coefficient c3, and the fourth coefficient d3 of the third mapping curve.

In a possible implementation, when being configured to construct the second system of equations based on the coordinates of the second end node, the coordinates of the third end node, and the preset first derivative of the third end node, the processing module is specifically configured to: substitute the coordinates of the second end node and the coordinates of the third end node into the first function expression to obtain a fifth equation and a sixth equation respectively, and enable a first derivative of the third end node on the third mapping curve to be equal to the preset first derivative of the third end node to obtain a seventh equation; enable a first derivative of the second mapping curve at the second end node to be equal to a first derivative of the third mapping curve at the third start node to obtain an eighth equation, and enable a second derivative of the second mapping curve at the second end node to be equal to a second derivative of the third mapping curve at the third start node to obtain a ninth equation; or enable a first derivative of the second mapping curve at the second end node to be equal to a preset first derivative of the second end node to obtain an eighth equation, and enable a first derivative of the third mapping curve at the third start node to be equal to a preset first derivative of the third start node to obtain a ninth equation; and combine the fifth equation, the sixth equation, the seventh equation, the eighth equation, and the ninth equation to obtain the second system of equations.

In a possible implementation, when being configured to perform tone mapping on the at least one frame of image based on the M mapping curves, the processing module is specifically configured to: perform tone mapping on each pixel in the at least one frame of image by using a mapping curve corresponding to a luminance range of the pixel.

In a possible implementation, after being configured to perform tone mapping on the at least one frame of image based on the M mapping curves, the processing module is further configured to correct, based on luminance information of each pixel in the at least one frame of image before and after tone mapping, color information of at least one frame of image obtained through mapping.

It should be understood that the third aspect corresponds to the technical solution in the first aspect. Therefore, beneficial effect obtained in the possible implementations is similar, and details are not described herein again.

According to a fourth aspect, an embodiment provides a metadata generation apparatus. The apparatus includes modules configured to perform the method in any one of the second aspect or the possible implementations of the second aspect.

For example, the apparatus may include:
an obtaining module, configured to obtain at least one frame of image; and
a processing module, configured to process the at least one frame of image to generate metadata, where the metadata includes a quantity M of mapping curves and coordinates of a start node and an end node of each mapping curve in a first coordinate system, the mapping curve is an N-power spline curve, a horizontal coordinate of the first coordinate system indicates image luminance before tone mapping, a vertical coordinate of the first coordinate system indicates image luminance after tone mapping, M is an integer greater than or equal to 1, and N is an integer greater than or equal to 3.

In a possible implementation, when being configured to process the at least one frame of image to generate metadata, the processing module is specifically configured to extract attribute information of the at least one frame of image, where the attribute information includes a maximum value, a minimum value, an average value, and a change range of luminance; and determining the metadata based on the attribute information.

In a possible implementation, the metadata includes the quantity M of mapping curves. When being configured to determine the metadata based on the attribute information, the processing module is specifically configured to: determine a luminance distribution status of the at least one frame of image based on the attribute information; divide the luminance of at least one frame of image into at least one luminance range based on the luminance distribution status; and determine the quantity M based on a quantity F of luminance ranges, where M is greater than or equal to F, and each luminance range corresponds to at least one mapping curve.

In a possible implementation, the metadata includes the coordinates of the end node and the start node of each mapping curve in the first coordinate system. When being configured to determine the metadata based on the attribute information, the processing module is specifically configured to determine the coordinates of the start node and the end node of each mapping curve in the first coordinate system based on the luminance distribution status and a maximum luminance value that can be displayed by a backend device.

In a possible implementation, the metadata further includes a preset first derivative of the start node and a preset first derivative of the end node of each mapping curve.

In a possible implementation, the metadata includes the preset first derivative of the end node and the preset first derivative of the start node of each mapping curve. When being configured to determine the metadata based on the attribute information, the processing module is specifically configured to determine the preset first derivative of the start node and the preset first derivative of the end node based on a balance requirement between the luminance and contrast of the at least one frame of image.

In a possible implementation, after being configured to process the at least one frame of image to generate metadata, the processing module is further configured to receive a first operation, where the first operation is used to change at least one of the quantity M, the coordinates of the start node in the first coordinate system, the coordinates of the end node in the first coordinate system, the preset first derivative of the start node, or the preset first derivative of the end node; and modify the metadata based on the first operation to obtain updated metadata.

It should be understood that the fourth aspect corresponds to the technical solution in the second aspect. Therefore, beneficial effect obtained in the possible implementations is similar, and details are not described herein again.

According to a fifth aspect, an embodiment provides an electronic device, including a non-volatile memory and a processor that are coupled to each other. The processor invokes program code stored in the memory to perform the method in any one of the first aspect or the possible implementations of the first aspect.

It should be understood that for details of technical effect that can be achieved in the fifth aspect, refer to the descriptions of technical effect brought by any one of the first aspect or the possible implementations of the first aspect. Details are not described herein again.

According to a sixth aspect, an embodiment provides an electronic device, including a non-volatile memory and a processor that are coupled to each other. The processor invokes program code stored in the memory to perform the method in any one of the second aspect or the possible implementations of the second aspect.

It should be understood that for details of technical effect that can be achieved in the sixth aspect, refer to the descriptions of technical effect brought by any one of the second aspect or the possible implementations of the second aspect. Details are not described herein again.

According to a seventh aspect, an embodiment provides a computer-readable storage medium, including a program or instructions. When the program or the instructions are run on a computer, the method in any one of the first aspect or the possible implementations of the first aspect is performed, or the method in any one of the second aspect or the possible implementations of the second aspect is performed.

It should be understood that for details of technical effect that can be achieved in the seventh aspect, refer to the descriptions of technical effect brought by any one of the first aspect or the possible implementations of the first aspect, or any one of the second aspect or the possible implementations of the second aspect. Details are not described herein again.

DESCRIPTION OF EMBODIMENTS

Figure 1:
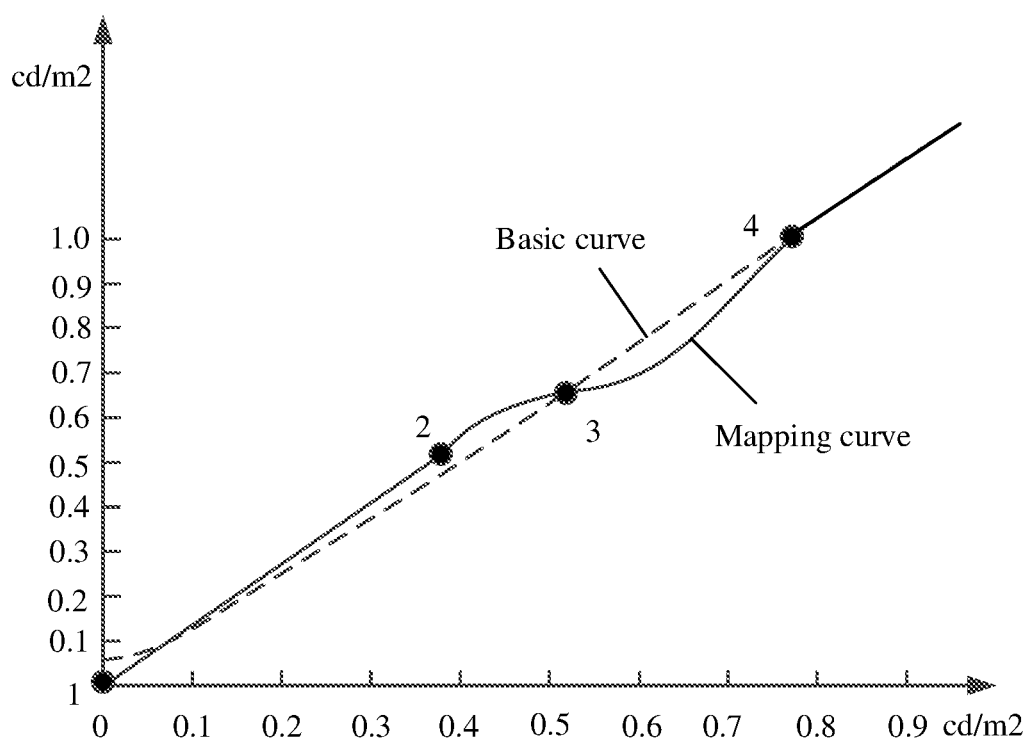
FIG. 1 is a schematic diagram of a mapping curve.

In embodiments of this disclosure, the term "at least one" indicates one or more, and "a plurality of" indicates two or more. The term "and/or" describes an association relationship between associated objects and indicates that three relationships may exist. For example, A and/or B may indicate the following three cases: Only A exists, both A and B exist, and only B exists. A and B each may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a-b, a-c, b-c, or a-b-c, where any one of a, b, c, a-b, a-c, b-c, or a-b-c may include a single a, a single b, and a single c, or may include a plurality of a, a plurality of b, and a plurality of c.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first priority criterion and a second priority criterion are merely used to distinguish between different criteria, but do not indicate different content, priorities, importance, or the like of the two criteria.

In addition, the terms "include" and "have" in embodiments, claims, and accompanying drawings of this application are not exclusive. For example, a process, a method, a system, a product, or a device including a series of steps or modules/units is not limited to the listed steps or modules, and may further include steps or modules/units that are not listed.

For ease of understanding, technical terms in embodiments of this application are first explained.

(1) A dynamic range is a ratio of maximum luminance to minimum luminance in a video or image signal.

(2) A high dynamic range (HDR) image is an image whose dynamic range ranges from 0.001 nits to 10000 nits, where nit is an illumination unit.

(3) A standard dynamic range (SDR) is also referred to as a low dynamic range below, and a standard dynamic range image is an image whose dynamic range typically ranges from 1 nit to 100 nits.

(4) Metadata is used to record key information of an image in a scene or frame. In embodiments of this application, the metadata may further include mapping curve parameters such as coordinates of a start node and an end node of a mapping curve in a first coordinate system. The metadata may further include dynamic metadata (dynamic metadata) and static metadata. The dynamic metadata may be understood as data (also referred to as attribute information below) associated with each frame of image, and the data may change with different pictures, for example, an average value, a maximum value, and a minimum value of pixel luminance in the scene. The static metadata may be understood as data associated with an image sequence, and the data remains unchanged in the image sequence.

(5) Tone mapping is a process of mapping luminance of an HDR image to a luminance range that can be displayed by a target display device. Specifically, tone mapping may be classified into high-dynamic-to-low-dynamic mapping and low-dynamic-to-high-dynamic mapping. For example, the HDR image includes a 4000-nit illumination signal, but an HDR display capability of the target display device (a television or an iPad) is only 500 nits. In this case, the 4000-nit signal needs to be mapped to the 500-nit device, that is, a process of tone mapping from high to low. For another example, the HDR image includes a 100-nit SDR signal, and a display capability of the target display device is only 2000 nits. In this case, the 100-nit signal needs to be mapped to the 2000-nit device, that is, a process of tone mapping from low to high.

(6) Image contrast indicates measurement of a difference between the brightest region and the darkest region in an image, that is, a value of grayscale contrast of the image. Larger difference indicates larger contrast, and smaller difference indicates smaller contrast. A good contrast ratio of 120:1 can easily display vivid and rich colors, and when the contrast ratio reaches 300:1, colors of all levels can be supported.

(7) The mapping curve is a function curve for mapping the luminance of the HDR image, and mainly relates to an N-power spline function curve in embodiments of this application.

(8) Display adaptation indicates a process of performing tone processing on an HDR video or image signal to adapt to a display feature of a target display device.

To perform tone mapping on the HDR image, the mapping curve may be generated based on one basic curve, and then tone mapping is performed on the HDR image based on the mapping curve. The basic curve may be a straight line, an electro-optic curve of scene luminance fidelity (SLF), an S-shaped (sigmoidal) function curve, or a Bessel curve. FIG. 1 shows a mapping curve. As shown in FIG. 1, a basic curve (namely, a dashed line in FIG. 1) is modified by using an N-power spline function, to obtain mapping curves. A mapping curve between a point 1 and a point 2 is a linear spline function curve. A mapping curve between the point 2 and a point 3 and a mapping curve between the point 3 and a point 4 are cubic spline function curves. A mapping curve after the point 4 is the basic curve.

It can be seen from FIG. 1 that the mapping curve is limited by the basic curve, which leads to poor mapping effect (for example, poor tone mapping effect of pixels in an extra bright or extra dark region). Consequently, display effect of an HDR image is poor.

To flexibly map an HDR image, an embodiment of this application provides a tone mapping method. The method may be performed by a backend device. In the method, the backend device may receive metadata and the HDR image from a frontend device, generate a mapping curve based on feature parameters of a mapping curve included in the metadata, and perform tone mapping on the HDR image based on the mapping curve. The feature parameters of the mapping curve are determined by the frontend device based on a luminance distribution status of the HDR image. Therefore, in this embodiment of this application, the mapping curve parameters are determined based on the luminance distribution status of the HDR image, without relying on a basic curve. In this way, design of the mapping curve is more flexible, luminance mapping effect for a specific luminance range (for example, an extra bright or extra dark region) is better, and display effect of the HDR image is improved.

Figure 2A:
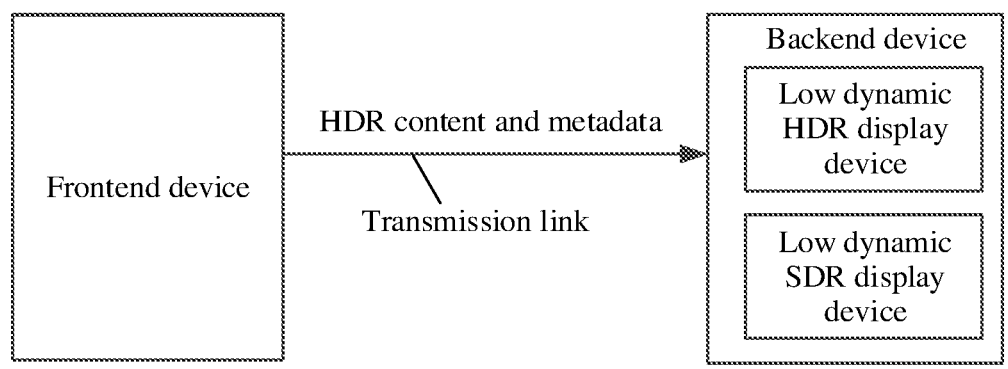
FIG. 2A is a schematic diagram of a possible system architecture to which an embodiment of this disclosure is applicable.

FIG. 2A is a schematic diagram of a possible system architecture to which an embodiment of this application is applicable. The system architecture in this embodiment of this application includes a frontend device, a transmission link, and a backend device.

The frontend device is configured to collect or produce HDR content (for example, a video or an image). For example, the frontend device may be a video capturing device, or may be a video production device.

In a possible embodiment, the frontend device may be further configured to extract corresponding metadata from the HDR content. The metadata may include parameter information of a mapping curve, and dynamic metadata and static metadata that correspond to the HDR content. The frontend device may encode the HDR content and the metadata, and then send encoded HDR content and metadata to the backend device through the transmission link. Specifically, the HDR content and the metadata may be transmitted in a form of one data packet, or transmitted in two data packets. This is not specifically limited in this embodiment of this disclosure.

The backend device may be configured to: receive the metadata and the HDR content, determine the mapping curve based on mapping curve parameters included in the metadata, perform tone mapping on the HDR content based on the mapping curve, and convert HDR content obtained through tone mapping into display content adapted to a display device in the backend device. It should be understood that "standard dynamic" in "standard dynamic HDR" and "standard dynamic SDR" in FIG. 2A is relative to the HDR content generated by the frontend device.

It should be further understood that, in different embodiments, the backend device may alternatively include a display device that has a capability of displaying a higher dynamic range of the HDR content generated by the frontend device. A display adaptation process of the display device may also be applied to the system architecture. This is not limited in this disclosure.

Figure 2B:
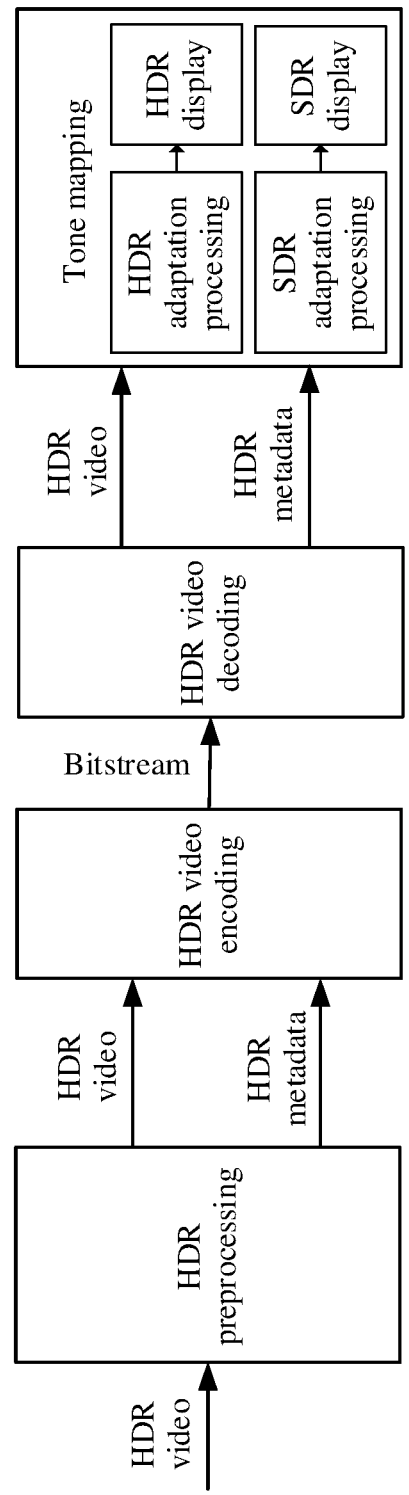
FIG. 2B is a schematic diagram of a structure of an image processing system according to an embodiment of this disclosure.

An embodiment further provides an HDR end-to-end image processing system. The system may be applied to the system architecture shown in FIG. 2A. In FIG. 2B, an HDR video is used as an example of the HDR content.

Referring to FIG. 2B, the image processing system includes an HDR preprocessing module, an HDR video encoding module, an HDR video decoding module, and a tone mapping module.

The HDR preprocessing module and the HDR video encoding module may be located in the frontend device shown in FIG. 2A, and the HDR video decoding module and the tone mapping module may be located in the backend device shown in FIG. 2A.

The HDR preprocessing module is configured to: extract dynamic metadata (for example, a maximum value, a minimum value, an average value, and a change range of luminance) from the HDR video; determine mapping curve parameters based on the dynamic metadata and a display capability of a target display device; write the mapping curve parameters into the dynamic metadata to obtain HDR metadata; and transmit the HDR metadata. The HDR video may be captured, or may be an HDR video processed by a colorist. The display capability of the target display device is a luminance range that can be displayed by the target display device.

The HDR video encoding module is configured to perform video encoding on the HDR video and the HDR metadata according to a video compression standard (for example, an AVS or HEVC standard) (for example, embed the HDR metadata into a user-defined portion of a bitstream), to output a corresponding bitstream (an AVS or HEVC bitstream).

The HDR video decoding module is configured to decode the generated bitstream (the AVS bitstream or the HEVC bitstream) according to a standard corresponding to a bitstream format, and output the decoded HDR video and HDR metadata.

The tone mapping module is configured to: generate a mapping curve based on the mapping curve parameters in the decoded HDR metadata; perform tone mapping (namely, HDR adaptation processing or SDR adaptation processing) on the decoded HDR video; and display an HDR-adapted video obtained through tone mapping on an HDR display terminal for displaying, or display an SDR-adapted video on an SDR display terminal for displaying.

For example, the HDR preprocessing module may exist in a video capturing device or a video production device.

For example, the HDR video encoding module may exist in the video capturing device or the video production device.

For example, the HDR video decoding module may exist in a set-top box, a television display device, a mobile terminal display device, and a video conversion device such as a live streaming or a network video application.

For example, the tone mapping module may exist in the set-top box, the television display device, the mobile terminal display device, and the video conversion device such as the live streaming or the network video application. More specifically, the tone mapping module may exist in a form of a chip in the set-top box, a television display, and a mobile terminal display, or may exist in a form of a software program in the video conversion device such as the live streaming or the network video application.

In a possible embodiment, when both the tone mapping module and the HDR video decoding module exist in the set-top box, the set-top box may complete functions of receiving, decoding, and tone mapping of a video bitstream. The set-top box sends, through a high-definition multimedia interface (HDMI), video data obtained through decoding to a display device for displaying, so that a user can enjoy video content.

With reference to specific accompanying drawings, the following describes a process in which the frontend device generates the metadata.

Figure 3A:
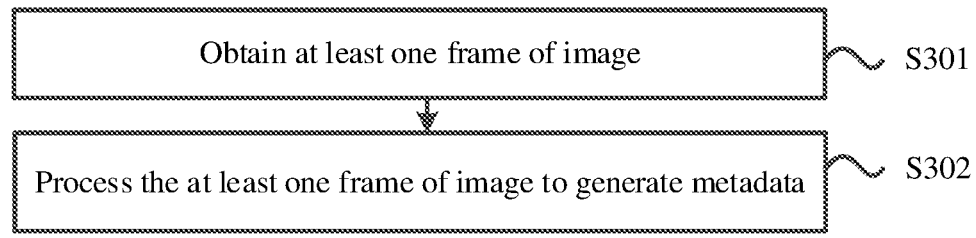
FIG. 3A is a schematic flowchart of a metadata generation method according to an embodiment of this disclosure.

FIG. 3A is a schematic flowchart of a metadata generation method. The method may be performed by a frontend device, and includes the following steps.

S301: Obtain at least one frame of image.

It should be understood that the at least one frame of image may be one or more frames of image. When the at least one frame of image is a plurality of consecutive frames of image, the at least one frame of image may be understood as a video.

S302: Process the at least one frame of image to generate metadata.

The metadata includes mapping curve parameters such as a quantity M of mapping curves and coordinates of a start node and an end node of each mapping curve in a first coordinate system. Each mapping curve is an N-power spline curve. A horizontal coordinate of the first coordinate system is image luminance before tone mapping, and a vertical coordinate of the first coordinate system is image luminance after tone mapping. A coordinate origin of the first coordinate system is (0, 0), namely, a point whose image luminance before and after tone mapping is 0. Optionally, the metadata may further include static metadata and dynamic metadata of the at least one frame of image.

In a possible embodiment, the metadata includes attribute information (namely, the dynamic metadata) of the at least one frame of image. That the frontend device processes the at least one frame of image to generate the metadata specifically includes: processing the at least one frame of image, extracting the attribute information of the at least one frame of image, and using the attribute information as partial information of the metadata.

Optionally, the attribute information may specifically include a maximum value, a minimum value, an average value, and a change range of luminance in a plurality of images corresponding to a same frame of image or a same scene (for example, a plurality of consecutive frames of image of a same photographed object). The change range indicates a deviation degree between pixel luminance and mean luminance of an image subblock and a concentrated distribution degree of the pixel luminance of the image subblock, and a smaller change range indicates more concentrated luminance. For example, the change range may be specifically a variance.

There are a plurality of implementations in which the frontend device processes the at least one frame of image and extracts the attribute information of the at least one frame of image, including but not limited to the following manners:

Manner 1: When the at least one frame of image has only one frame of image, a maximum value, a minimum value, an average value, and a change range of pixel luminance in the frame of image are determined to obtain attribute information.

Manner 2: When the at least one frame of image is a plurality of consecutive frames of image in a same scene, a maximum value, a minimum value, an average value, and a change range of pixel luminance in the plurality of frames of image are collected, to obtain final attribute information.

Figure 3B:
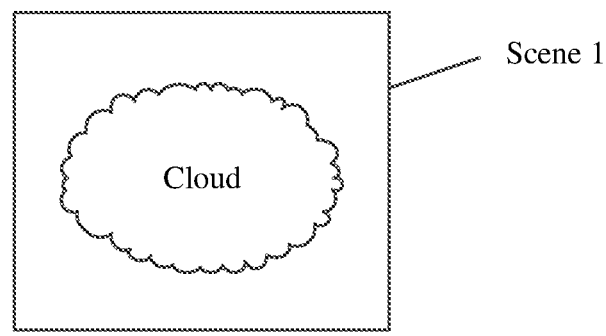
FIG. 3B is a schematic diagram of a possible scene according to an embodiment of this disclosure.

Optionally, when extracting the attribute information of the at least one frame of image, the frontend device may specifically extract attribute information of a local region (for example, a region of interest) in the at least one frame of image. For example, a region of interest in an image scene 1 shown in FIG. 3B is a region in which one cloud is located. When determining attribute information of the image scene 1, the frontend device may specifically determine pixel luminance values corresponding to the cloud in at least one frame of image corresponding to the scene 1, further obtain a maximum value, a minimum value, an average value, and a change range of luminance of the cloud through statistics, and use the maximum value, the minimum value, the average value, and the change range of the luminance of the cloud as the attribute information of the scene 1.

In a possible embodiment, after extracting the attribute information of the at least one frame of image, the frontend device may determine the metadata based on the attribute information.

In a possible embodiment, the metadata includes the quantity of mapping curves. A specific implementation in which the frontend device determines the metadata based on the attribute information may include: determining a luminance distribution status of the at least one frame of image based on the attribute information, dividing luminance of the at least one frame of image into at least one luminance range based on the luminance distribution status, and determining the quantity M based on a quantity F of luminance ranges. M is greater than or equal to F, and each luminance range corresponds to at least one mapping curve. Specifically, the luminance distribution status may be represented by using a luminance distribution histogram or a luminance distribution pie chart. This is not specifically limited in this embodiment of this application.

Figure 4A:
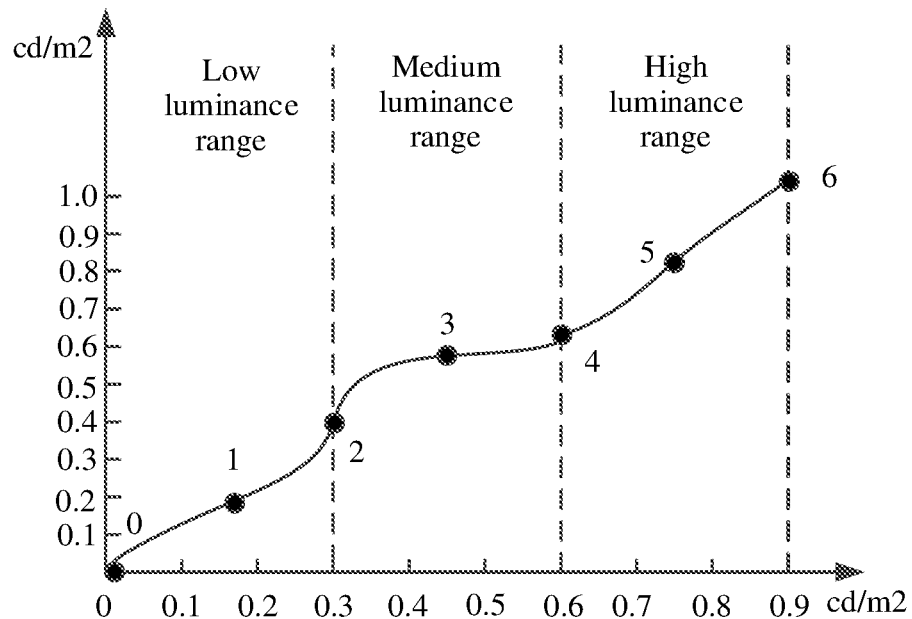
FIG. 4A is a schematic diagram of a mapping curve according to an embodiment of this disclosure.
Figure 4B:
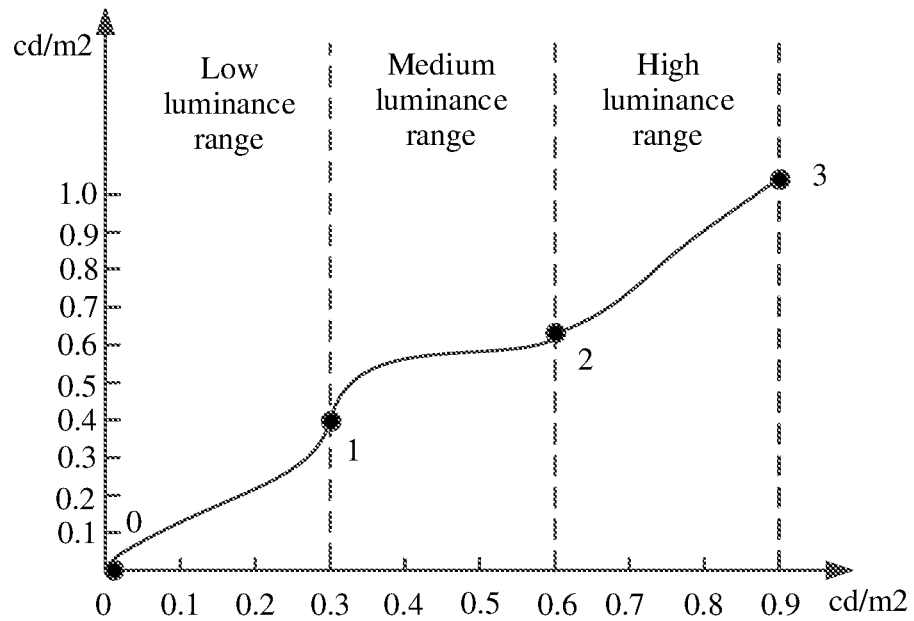
FIG. 4B is a schematic diagram of another mapping curve according to an embodiment of this disclosure.

Example 1: Refer to FIG. 4A and FIG. 4B. The frontend device analyzes a luminance histogram of a first image, and finds that luminance of the first image is evenly distributed; in this case, the frontend device divides the luminance of the first image into a low luminance range (0 cd/m2 to 0.3 cd/m2), a medium luminance range (0.3 cd/m2 to 0.6 cd/m2), and a high luminance range (0.6 cd/m2 to 0.9 cd/m2). Each luminance range is considered to have content of interest. A mapping curve is generated in each luminance range by using an odd or even quantity of cubic spline functions.

Horizontal coordinates in coordinate systems in FIG. 4A and FIG. 4B indicate image luminance before tone mapping, and vertical coordinates indicate image luminance after tone mapping.

A difference between FIG. 4A and FIG. 4B lies in that a quantity of mapping curves in each luminance range in FIG. 4A is different from a quantity of mapping curves in each luminance range in FIG. 4B.

As shown in FIG. 4A, two mapping curves are used for each of the low luminance range, the medium luminance range, and the high luminance range. Specifically, a start node of a first mapping curve in the low luminance range is a point 0 (0, 0), and an end node is a point 1 (0.28, 0.29). A start node of a second mapping curve in the low luminance range is the point 1 (0.28, 0.29), and an end node is a point 2 (0.3, 0.36). A start node of a first mapping curve in the medium luminance range is the point 2 (0.3, 0.36), and an end node is a point 3 (0.43, 0.55). A start node of a second mapping curve in the medium luminance range is the point 3 (0.43, 0.55), and an end node is a point 4 (0.6, 0.58). A start node of a first mapping curve in the high luminance range is the point 4 (0.6, 0.58), and an end node is a point 5 (0.75, 0.76). A start node of a second mapping curve in the high luminance range is the point 5 (0.75, 0.76), and an end node is a point 6 (0.9, 0.98).

As shown in FIG. 4B, one mapping curve is used for each of the low luminance range, the medium luminance range, and the high luminance range. A start node of a mapping curve in the low luminance range is a point 0 (0, 0), and an end node is a point 1 (0.3, 0.38). A start node of a mapping curve in the medium luminance range is the point 1 (0.3, 0.38), and an end node is a point 2 (0.6, 0.58). A start node of a mapping curve in the high luminance range is the point 2 (0.6, 0.58), and an end node is a point 3 (0.9, 0.88).

Figure 5A:
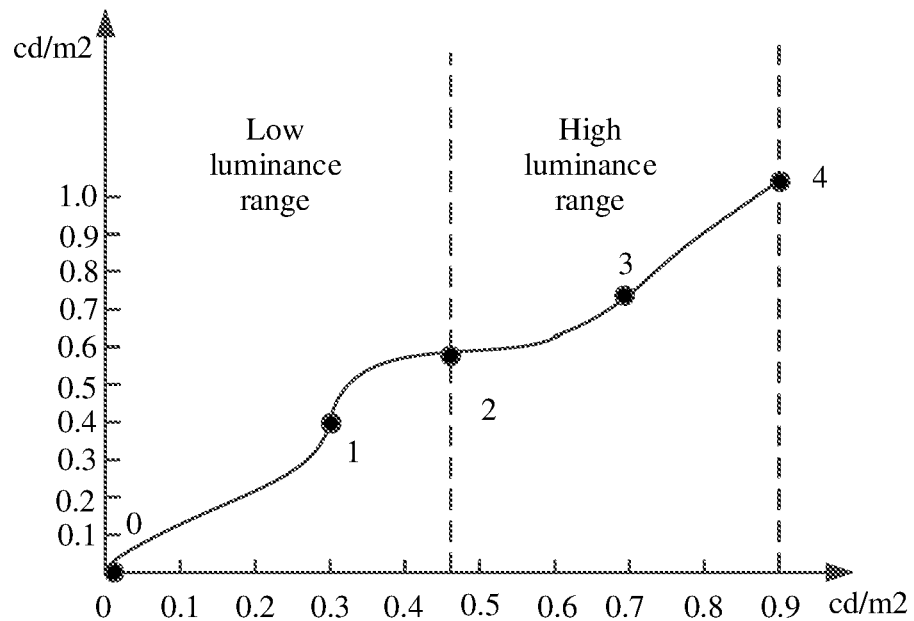
FIG. 5A is a schematic diagram of a mapping curve according to an embodiment of this disclosure.
Figure 5B:
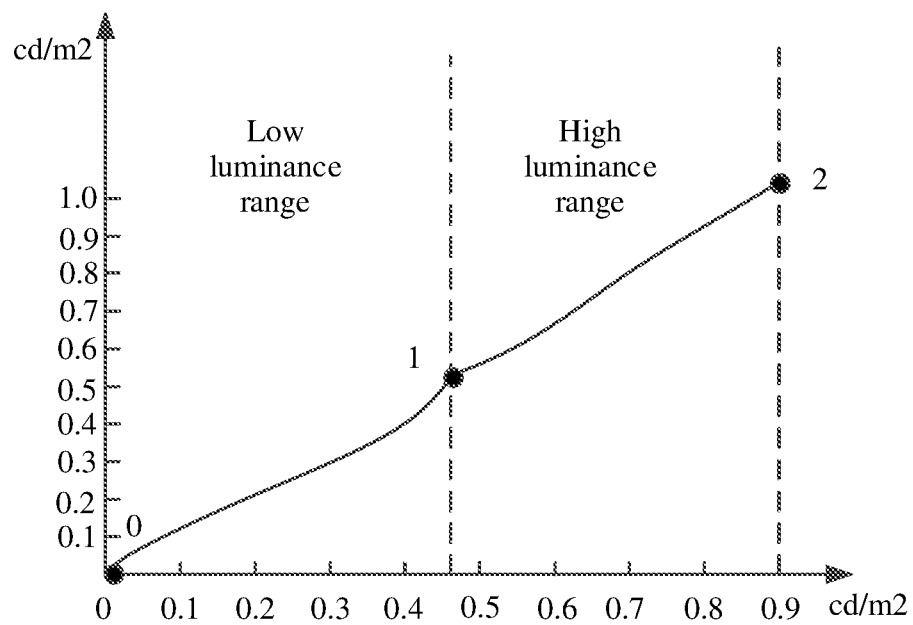
FIG. 5B is a schematic diagram of another mapping curve according to an embodiment of this disclosure.

Example 2: Refer to FIG. 5A and FIG. 5B. The frontend device analyzes a luminance histogram of a second image, and determines that luminance of the second image is evenly distributed in a low luminance range and a high luminance range; in this case, the frontend device divides the luminance of the second image into the low luminance range and the high luminance range, and generates mapping curves in the low luminance range and the high luminance range by using an odd or even quantity of cubic spline functions.

In coordinate systems in FIG. 5A and FIG. 5B, horizontal coordinates indicate image luminance before tone mapping, vertical coordinates indicate image luminance after tone mapping, and coordinate origins (0, 0).

A difference between FIG. 5A and FIG. 5B lies in that a quantity of mapping curves in each luminance range in FIG. 5A is different from a quantity of mapping curves in each luminance range in FIG. 5B.

As shown in FIG. 5A, two mapping curves are used for each of the low luminance range and the high luminance range. A start node of a first mapping curve in the low luminance range is a point 0 (0, 0), and an end node is a point 1 (0.6, 0.7). A start node of a second mapping curve in the low luminance range is the point 1 (0.6, 0.7), and an end node is a point 2 (0.46, 0.58). A start node of a first mapping curve in the high luminance range is the point 2 (0.46, 0.58), and an end node is a point 3 (0.72, 0.68). A start node of a second mapping curve in the high luminance range is the point 3 (0.72, 0.68), and an end node is a point 4 (0.9, 0.88).

As shown in FIG. 5B, one mapping curve is used for each of the low luminance range and the high luminance range. A start node of a mapping curve in the low luminance range is a point 0 (0, 0), and an end node is a point 1 (0.46, 0.58). A start node of a mapping curve in the high luminance range is the point 1, and an end node is a point 2 (0.9, 0.88).

Figure 6A:
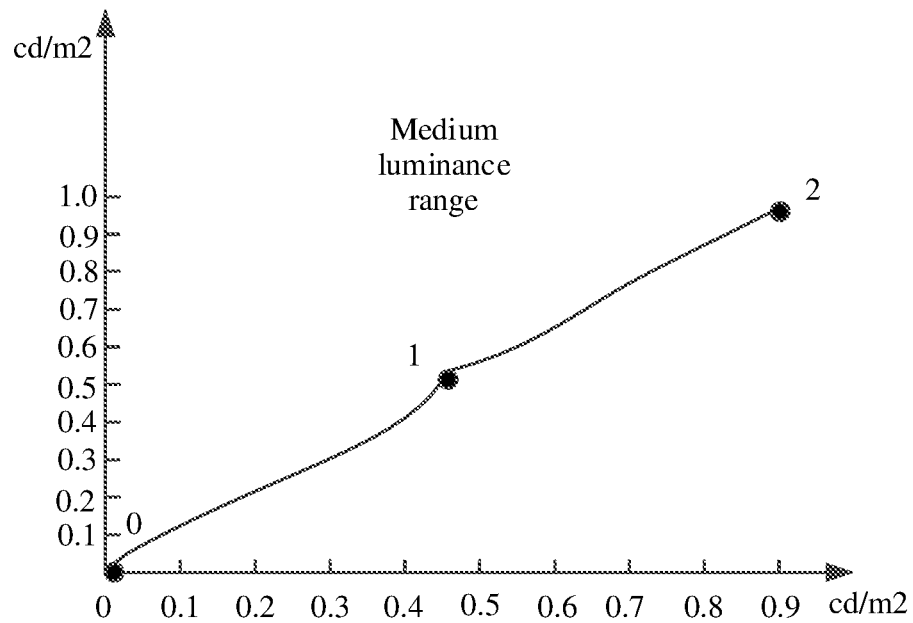
FIG. 6A is a schematic diagram of a mapping curve according to an embodiment of this disclosure.
Figure 6B:
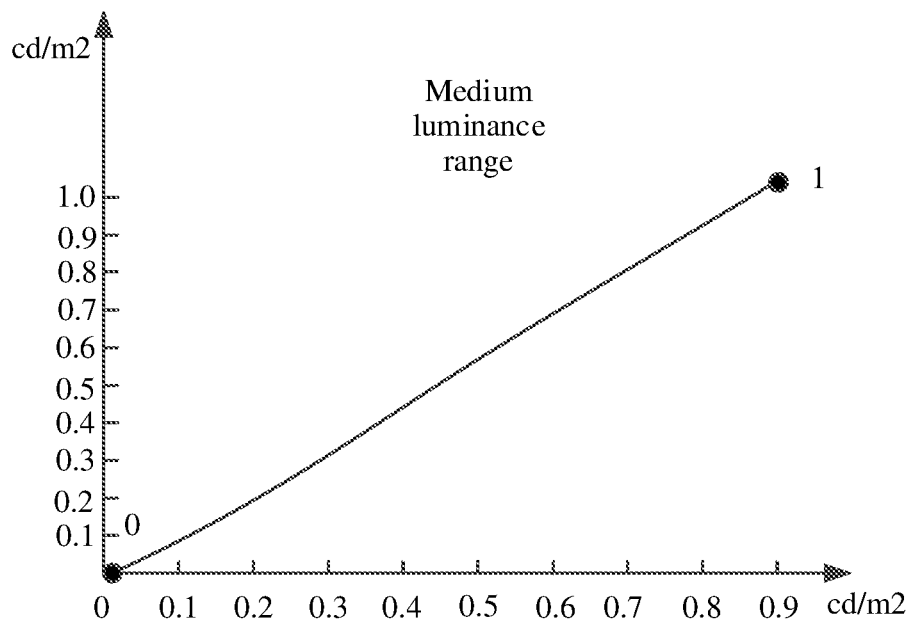
FIG. 6B is a schematic diagram of another mapping curve according to an embodiment of this disclosure.

Example 3: Referring to FIG. 6A and FIG. 6B, the front end device analyzes a luminance histogram of a third image, and determines that luminance of the third image is evenly distributed in a medium luminance range and that there is no extra dark or extra bright region; in this case, the frontend device divides the luminance of the third image into only the medium luminance range. In coordinate systems in FIG. 6A and FIG. 6B, horizontal coordinates indicate image luminance before tone mapping, vertical coordinates indicate image luminance after tone mapping, and coordinate origins are (0, 0).

A difference between FIG. 6A and FIG. 6B lies in that a quantity of mapping curves in the medium luminance range in FIG. 6A is different from a quantity of mapping curves in each luminance range in FIG. 6B.

As shown in FIG. 6A, two mapping curves are used for the medium luminance range. A start node of a first mapping curve in the medium luminance range is a point 0 (0, 0), and an end node is a point 1 (0.46, 0.48). A start node of a second mapping curve in the medium luminance range is the point 1 (0.46, 0.48), and an end node is a point 2 (0.9, 0.88).

As shown in FIG. 6B, one mapping curve is used for the medium luminance range. A start node of the mapping curve in the medium luminance range is a point 0 (0, 0), and an end node is a point 1 (0.9, 0.88).

In the examples corresponding to FIG. 4A, FIG. 5A, and FIG. 6A, for a same luminance range, two N-power spline curves are used to form a mapping curve, thereby effectively improving flexibility of the mapping curve, and further improving tone mapping effect.

In the examples corresponding to FIG. 4B, FIG. 5B, and FIG. 6B, for a same luminance range, one N-power spline curve is used to form a mapping curve, and a few mapping curve parameters are required, thereby effectively improving metadata transmission efficiency.

It should be noted that the luminance ranges in the foregoing examples are the low luminance range, the medium luminance range, and the high luminance range. In actual application, the luminance range may alternatively be divided in another manner. For example, the luminance range may further include a medium high luminance range, a medium low luminance range, and the like. This is not specifically limited in this disclosure.

It should be further noted that one or two mapping curves are mainly used as an example in each luminance range. In actual application, there may be more mapping curves in each luminance range. This is not specifically limited in this disclosure.

In a possible embodiment, the metadata includes coordinates of an end node and a start node of each mapping curve in the first coordinate system. That the frontend device determines the metadata based on the attribute information may specifically include: determining the coordinates of the start node and the end node of each mapping curve in the first coordinate system based on the luminance distribution status and a maximum luminance value that can be displayed by a backend device.

Example 1: When a luminance range of the at least one frame of image is divided into a low luminance range, a medium luminance range, and a high luminance range, and each luminance range corresponds to one mapping curve, a start node of a mapping curve 1 corresponding to the low luminance range may be set to an origin (0, 0), a horizontal coordinate of an end node of the mapping curve 1 may be set to a luminance value greater than or equal to luminance of each of 30% pixels in the at least one frame of image, and a vertical coordinate of the end node of the mapping curve 1 may be set to 50% of the maximum luminance value that can be displayed by the backend device. A start node of a mapping curve 2 corresponding to the medium luminance range is set as the end node of the mapping curve 1, a horizontal coordinate of an end node of the mapping curve 2 may be set to a luminance value greater than luminance of each of 70% pixels in the at least one frame of image, and a vertical coordinate of the end node of the mapping curve 2 may be set to 70% of the maximum luminance value that can be displayed by the backend device. A start node of a mapping curve 3 corresponding to the high luminance range is set as the end node of the mapping curve 2, a horizontal coordinate of an end node of the mapping curve 3 may be set to a maximum value of pixel luminance of the at least one frame of image, and a vertical coordinate of the end node of the mapping curve 3 may be set to the maximum luminance value that can be displayed by the backend device.

The high luminance range in FIG. 4B is used as an example. A maximum value of pixel luminance in the first image is 0.9 cd/m2, and the maximum luminance value that can be displayed by the backend device is 0.98 cd/m2. In this case, a horizontal coordinate of the end node of the mapping curve corresponding to the high luminance range is set to 0.9 cd/m2, and a vertical coordinate of the end node of the mapping curve is set to 0.98 cd/m2.

Example 2: When a luminance range of the at least one frame of image is divided into a low luminance range and a high luminance range, and each luminance range corresponds to one mapping curve, a start node of a mapping curve 4 corresponding to the low luminance range may be set to an origin (0, 0), a horizontal coordinate of an end node of the mapping curve 4 may be set to a luminance value greater than or equal to luminance of each of 50% pixels in the at least one frame of image, and a vertical coordinate of the end node of the mapping curve 4 may be set to 30% of the maximum luminance value that can be displayed by the backend device. A start node of a mapping curve 5 corresponding to the high luminance range is set as the end node of the mapping curve 4, a horizontal coordinate of the end node of the mapping curve 4 may be set to a maximum value of pixel luminance of the at least one frame of image, and a vertical coordinate of the end node of the mapping curve 4 may be set to the maximum luminance value that can be displayed by the backend device.

The low luminance range in FIG. 5B is used as an example. Luminance of 50% pixels in the second image is less than 0.46 cd/m2, and 30% of the maximum luminance value that can be displayed by the backend device is 0.48 cd/m2. In this case, a horizontal coordinate of the end node of the mapping curve corresponding to the low luminance range is set to 0.46 cd/m2, and a vertical coordinate of the end node of the mapping curve is set to 0.48 cd/m2.

Example 3: When a luminance range of the at least one frame of image is divided into only a medium luminance range, and the medium luminance range corresponds to a mapping curve 6 and a mapping curve 7, a start node of the mapping curve 6 may be set to the origin (0, 0), a horizontal coordinate of an end node of the mapping curve 6 may be set to a value greater than or equal to luminance of each of 50% pixels in the at least one frame of image, and a vertical coordinate of the end node of the mapping curve 6 may be set to 53% of the maximum display luminance that can be displayed by the backend device. A start node of the mapping curve 7 may be set as the end node of the mapping curve 6, a horizontal coordinate of an end node of the mapping curve 7 may be set to a maximum value of pixel luminance of the at least one frame of image, and a vertical coordinate of the end node of the mapping curve 7 may be set to the maximum luminance value that can be displayed by the backend device.

The medium luminance range in FIG. 6A is used as an example. The medium luminance range corresponds to a mapping curve 6 and a mapping curve 7. In FIG. 6A, the curve between the point 0 and the point 1 is the mapping curve 6, and the curve between the point 1 and the point 2 is the mapping curve 7. A maximum value of pixel luminance in the third image is 0.9 cd/m2, the maximum luminance value that can be displayed by the backend device is 0.98 cd/m2, luminance of 50% pixels in the third image is not greater than 0.46 cd/m2, and 53% of the maximum display luminance of the backend device is 0.48 cd/m2. In this case, a horizontal coordinate of an end node of the mapping curve 6 is set to 0.46 cd/m2, and a vertical coordinate of the end node of the mapping curve 6 is set to 0.48 cd/m2; and a horizontal coordinate of an end node of the mapping curve 7 is set to 0.9 cd/m2, and a vertical coordinate of the end node of the mapping curve 7 is set to 0.98 cd/m2.

In a possible embodiment, the metadata may further include a preset first derivative of the start node and a preset first derivative of the end node of each mapping curve.

Correspondingly, that the frontend device determines the metadata based on the attribute information further includes: determining the preset first derivative of the start node and the preset first derivative of the end node of each mapping curve based on a balance requirement between the luminance and contrast of the at least one frame of image. It should be understood that the contrast herein is the foregoing image contrast.

For example, if the image luminance of the at least one frame of image is desired to be maintained, the first derivative may be set to a larger value; or if the image contrast of the at least one frame of image is desired to be enhanced, the first derivative may be set to a smaller value.

It can be learned from the foregoing descriptions that, in this embodiment of this application, parameter design of the mapping curve is determined based on the luminance distribution status of the image, and may not be limited by a basic curve. Therefore, a form is flexible, and large adjustment space can be provided for different luminance ranges, thereby achieving better adaptation effect.

In a possible embodiment, after processing the at least one frame of image and generating the metadata, the frontend device may further receive a first operation, and modify the metadata based on the first operation to obtain updated metadata. The first operation may be used to change at least one of the quantity M of mapping curves, the coordinates of the start node in the first coordinate system, the coordinates of the end node in the first coordinate system, the preset first derivative of the start node, and the preset first derivative of the end node.

It should be understood that the first operation may be understood as an operation of a user. For example, after processing an image A, the frontend device divides the image A into two luminance ranges, and designs parameters of two mapping curves for the image A. However, to improve tone mapping efficiency, a director may adjust a quantity of mapping curves corresponding to the image A to 1. In this case, an operation of changing the quantity of mapping curves by the director is a first operation. In this way, the frontend device may dynamically adjust parameter information of the mapping curve based on a user requirement, to effectively meet a user preference requirement and effectively improve user experience.

In a possible embodiment, after generating the metadata, the frontend device may encode the at least one frame of image and the metadata, and send encoded at least one frame of image and metadata to the backend device in a form of a bitstream. After receiving the bitstream, the backend device decodes the bitstream, determines the mapping curve based on the decoded metadata, and finally performs tone mapping on an image in an HDR video based on the mapping curve, to convert the image into a display image adapted to a display device.

With reference to a specific accompanying drawing, the following describes a process of tone mapping.

Figure 7:
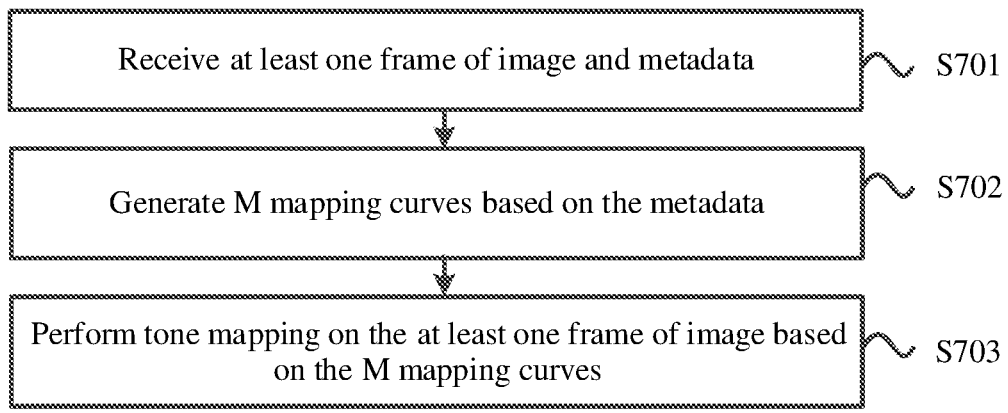
FIG. 7 is a schematic flowchart of a tone mapping method according to an embodiment of this disclosure.

FIG. 7 is a schematic flowchart of a tone mapping method. The method may be performed by a backend device, and specifically includes the following steps.

S701: Receive at least one frame of image and metadata.

Generally, the at least one frame of image (an HDR image or video) and the metadata each are transmitted in a form of a bitstream. In this embodiment of this application, data corresponding to the at least one frame of image may be an optical signal or an electrical signal. This is not limited in this application. If the data is the electrical signal, the electrical signal may be converted into an optical signal according to an optical-electro signal transfer function.

It should be understood that a format of the metadata is not limited in this embodiment of this application. For example, the metadata is consistent with the foregoing metadata sent by the frontend device. In other words, the metadata may include a quantity M of mapping curves and coordinates of a start node and an end node of each mapping curve in a first coordinate system. The mapping curve is an N-power spline curve, a horizontal coordinate of the first coordinate system indicates image luminance before tone mapping, and a vertical coordinate of the first coordinate system indicates image luminance after tone mapping. M is an integer greater than or equal to 1, and N is an integer greater than or equal to 3.

In a possible embodiment, a display device in the backend device may directly receive the bitstream from the frontend device, and decode the bitstream to obtain the at least one frame of image and the metadata.

In another possible embodiment, the backend device includes a decoding device (for example, a set-top box) and a display device (for example, a television). After receiving the bitstream from the frontend device, the decoding device decodes the bitstream to obtain the at least one frame of image and the metadata, and sends at least one decoded frame of image and decoded metadata to the display device.

Optionally, the metadata further includes a preset first derivative of the start node and a preset first derivative of the end node. Specifically, the metadata received by the backend device includes the preset first derivative of the start node and the preset first derivative of the end node of each mapping curve.

Alternatively, the metadata does not include the preset first derivative of the start node and the preset first derivative of the end node. Instead, the backend device stores a mapping table between start nodes and end nodes of all mapping curves and preset first derivatives. After receiving the metadata, the backend device may determine the preset first derivatives corresponding to the start node and the end node of each curve in the metadata based on the mapping table.

S702: Generate the M mapping curves based on the metadata.

It should be understood that each of the at least one frame of image may correspond to at least one luminance range, and each luminance range corresponds to at least one mapping curve. In other words, each frame of image may correspond to one or more luminance ranges, and one luminance range may correspond to one or more mapping curves.

For example, a first image may correspond to a low luminance range, a high luminance range, and a medium luminance range; or correspond to a low luminance range and a high luminance range; or corresponds to a low luminance range. This is not specifically limited in this embodiment of this application. Each luminance range may correspond to an odd or even quantity of mapping curves, and may be specifically one or two mapping curves. This is not specifically limited in this embodiment of this application.

In a possible embodiment, a function expression corresponding to the mapping curve may be an N-power polynomial, the N-power polynomial includes N+1 monomials, and each monomial corresponds to one coefficient.

A function expression corresponding to an $i^{th}$ mapping curve in the at least one mapping curve corresponding to each luminance range may be specifically:

$$y=di^*(x-x2)^N + \ldots + ci^*(x-x2)^2 + bi^*(x-x2) + ai, \text{ where}$$

x is an independent variable and is used to represent the image luminance before tone mapping, y is a dependent variable and is used to represent the image luminance after tone mapping, ai is a coefficient of a constant term in the $i^{th}$ mapping curve, bi is a coefficient of a linear monomial in the $i^{th}$ mapping curve, ci is a coefficient of a quartic monomial in the $i^{th}$ mapping curve, di is a coefficient of an $N^{th}$-power monomial in the $i^{th}$ mapping curve, x2 is a horizontal coordinate of a start node of the $i^{th}$ mapping curve, and none of ai, bi, ci, and di is 0.

A first function expression corresponding to the $i^{th}$ mapping curve may be a cubic spline function: $y=di^*(x-x2)^3 + ci^*(x-x2)^2 + bi^*(x-x2) + ai$, where x is the independent variable and is used to represent the image luminance before tone mapping, y is the dependent variable and is used to represent the image luminance after tone mapping, ai is the coefficient of the constant term in the $i^{th}$ mapping curve, bi is the coefficient of the linear monomial in the $i^{th}$ mapping curve, ci is the coefficient of the quartic monomial in the $i^{th}$ mapping curve, di is a coefficient of the cubic monomial in the $i^{th}$ mapping curve, x2 is the horizontal coordinate of the start node of the $i^{th}$ mapping curve, and none of ai, bi, ci, and di is 0.

Optionally, the first function expression corresponding to the $i^{th}$ mapping curve may alternatively be a quartic spline function: $y=ei^*(x-x2)^4 + di^*(x-x2)^3 + ci^*(x-x2)^2 + bi^*(x-x2) + ai$, where x is the independent variable and is used to represent the image luminance before tone mapping, y is the dependent variable and is used to represent the image luminance after tone mapping, ai is the coefficient of the constant term in the $i^{th}$ mapping curve, bi is the coefficient of the linear monomial in the $i^{th}$ mapping curve, ci is the coefficient of the quartic monomial in the $i^{th}$ mapping curve, di is the coefficient of the cubic monomial in the $i^{th}$ mapping curve, ei is a coefficient of a quartic monomial in the $i^{th}$ mapping curve, x2 is the horizontal coordinate of the start node of the $i^{th}$ mapping curve, and none of ai, bi, ci, and di is 0.

It should be understood that the cubic spline function curve and the quartic spline function curve are merely used as examples instead of limitations. In actual application, the cubic spline function curve and the quartic spline function curve each may alternatively be another spline function curve.

There are a plurality of implementations in which the backend device generates, based on the metadata, the mapping curve corresponding to each luminance range, including but not limited to the following manners:

Manner 1: A first luminance range in the at least one luminance range corresponds to a first mapping curve, and the first mapping curve includes a first start node and a first end node. The generating the M mapping curves based on the metadata includes: substituting coordinates of the first start node into a first function expression to obtain a first coefficient a1 of the first mapping curve; substituting coordinates of the first end node into the first function expression to obtain a first equation; enabling a first derivative of the first mapping curve at the first start node to be equal to a preset first derivative of the first start node to obtain a second equation; enabling a first derivative of the first mapping curve at the first end node to be equal to a preset first derivative of the first end node to obtain a third equation; combining the first equation, the second equation, and the third equation to obtain a first system of equations; parsing the first system of equations to obtain a second coefficient b1, a third coefficient c1, and a fourth coefficient d1 of the first mapping curve; and generating the first mapping curve based on the first coefficient a1, the second coefficient b1, the third coefficient c1, and the fourth coefficient d1 of the first mapping curve.

For example, still refer to FIG. 4B. The medium luminance range is used as an example, and it is assumed that an expression of a first mapping curve between the point 1 and the point 2 is:

$$F1(x)=d1*(x-x1)^3+c1*(x-x1)^2+b1*(x-x1)+a1 \quad (1)$$

Coordinates of the start node (the point 1) of the first mapping curve in the first coordinate system are (x1, y1), and coordinates of the end node (the point 2) of the first mapping curve in the first coordinate system are (x2, y2), where a1, b1, c1, and d1 are function coefficients of the first mapping curve.

A specific process of solving the function coefficients is:
substituting the coordinates of the point 1 into Formula (1) to obtain y1=a1;
substituting the coordinates of the point 1 into Formula (1) to obtain a first equation y2=d1*(x2−x1)³+c1*(x2−x1)²+b1*(x2−x1)+a1;
setting a first derivative of Formula (1) at the point 1 to be equal to a preset first derivative G1 of the point 1 to obtain a second equation G1=d1*3(x−x1)²+c1*(x−x1)+b1;

setting a first derivative of Formula (1) at the point 2 to be equal to a preset first derivative G2 of the point 2 to obtain a third equation G2=d1*3(x2−x1)²+c1*(x2−x1)+b1; and
combining y1=a1, the first equation, the second equation, and the third equation to obtain a first system of equations; analyzing the first system of equations to obtain the second coefficient b1, the third coefficient c1, and the fourth coefficient d1 of the first mapping curve; and generating the first mapping curve based on the first coefficient a1, the second coefficient b1, the third coefficient c1, and the fourth coefficient d1 of the first mapping curve.

It should be noted herein that, to ensure continuity of the entire mapping curve, each node may have only a unique derivative value. In addition, to avoid an oscillating cubic spline function and excessive correction, the first derivatives of the first mapping curve are always greater than 0.

Manner 2: Each of the at least one luminance range is further divided into luminance sub-ranges. For example, the medium luminance range is divided into a first luminance sub-range and a second luminance sub-range, where the first luminance sub-range corresponds to a second mapping curve, and the second luminance sub-range corresponds to a third mapping curve. A maximum value in the first luminance sub-range is equal to a minimum value in the second luminance sub-range. The second mapping curve includes a second start node and a second end node. The third mapping curve includes a third start node and a third end node. Coordinates of the second end node are the same as coordinates of the third start node.

When generating the M mapping curves based on the metadata, the backend device may simultaneously calculate function coefficients of the second mapping curve and the third mapping curve. A specific process may be: substituting coordinates of the second start node into a first function expression to obtain a first coefficient a2 of the second mapping curve; substituting the coordinates of the third start node into the first function expression to obtain a first coefficient a3 of the third mapping curve; enabling a first derivative of the second mapping curve at the second start node to be equal to a preset first derivative of the second start node to establish a fourth equation; analyzing the fourth equation to obtain a second coefficient b2 of the second mapping curve; constructing a second system of equations based on the coordinates of the second end node, the coordinates of the third end node, and a preset first derivative of the third end node; parsing the second system of equations to obtain a third coefficient c2 and a fourth coefficient d2 of the second mapping curve, and a second coefficient b3, a third coefficient c3, and a fourth coefficient d3 of the third mapping curve; generating the second mapping curve based on the first coefficient a2, the second coefficient b2, the third coefficient c2, and the fourth coefficient d2 of the second mapping curve; and generating the third mapping curve based on the first coefficient a3, the second coefficient b3, the third coefficient c3, and the fourth coefficient d3 of the third mapping curve.

There are a plurality of implementations of constructing the second system of equations based on the coordinates of the second end node, the coordinates of the third end node, and the preset first derivative of the third end node, including but not limited to the following manners:

Manner 1: The coordinates of the second end node and the coordinates of the third end node are substituted into the first function expression to obtain a fifth equation and a sixth equation respectively. A first derivative of the third end node on the third mapping curve is enabled to be equal to the preset first derivative of the third end node to obtain a seventh equation. A first derivative of the second mapping curve at the second end node is enabled to be equal to a first derivative of the third mapping curve at the third start node to obtain an eighth equation. A second derivative of the second mapping curve at the second end node is enabled to be equal to a second derivative of the third mapping curve at the third start node to obtain a ninth equation. The fifth equation, the sixth equation, the seventh equation, the eighth equation, and the ninth equation are combined to obtain the second system of equations.

In Manner 1, the first derivative of the second mapping curve at the second end node is enabled to be equal to the first derivative of the third mapping curve at the third start node, and the second derivative of the second mapping curve at the second end node is enabled to be equal to the second derivative of the third mapping curve at the third start node, to solve the function coefficients of the mapping curve. Therefore, the metadata does not need to carry preset first derivatives of the second end node and the third start node. This effectively improves metadata transmission efficiency.

Manner 2: The coordinates of the second end node and the coordinates of the third end node are substituted into the first function expression to obtain a fifth equation and a sixth equation respectively. A first derivative of the third end node on the third mapping curve is enabled to be equal to the preset first derivative of the third end node to obtain a seventh equation. Alternatively, a first derivative of the second mapping curve at the second end node is enabled to be equal to a preset first derivative of the second end node to obtain an eighth equation. A first derivative of the third mapping curve at the third start node is enabled to be equal to a preset first derivative of the third start node to obtain a ninth equation. The fifth equation, the sixth equation, the seventh equation, the eighth equation, and the ninth equation are combined to obtain the second system of equations.

In Manner 2, the first derivative of the second mapping curve at the second end node is equal to the preset first derivative of the second end node, and the first derivative of the third mapping curve at the third start node is equal to the preset first derivative of the third start node, to solve the function coefficients of the mapping curve. This can reduce a calculation amount of the backend device.

For example, still refer to FIG. 4A. The medium luminance range is used as an example. A second mapping curve of the medium luminance range is the mapping curve between the point 2 and the point 3, and an expression of the second mapping curve is:

$$F2(x)=d2*(x-x2)^3+c2*(x-x2)^2+b2*(x-x2)+a2 \quad (2)$$

A third mapping curve of the medium luminance range is the mapping curve between the point 3 and the point 4, and an expression of the mapping curve is:

$$F3(x)=d3*(x-x3)^3+c3*(x-x3)^2+b3*(x-x3)+a3 \quad (3)$$

A coordinate form of each node is (xi, yi). For example, coordinates of the point 2 is (x2, y2), coordinates of the point 3 are (x3, y3), and coordinates of the point 4 are (x4, y4). d2, c2, b2, and a2 are the function coefficients of the second mapping curve, and d3, c3, b3, and a3 are the function coefficients of the third mapping curve.

A process of solving the function coefficients in a combination manner is:

substituting the coordinates of the point 2 into Formula (2) to obtain y2=a2;

substituting the coordinates of the point 3 into Formula (3) to obtain y3=a3;

enabling a first derivative of Formula (2) at the point 2 to be equal to a preset first derivative G3 of the point 2 to obtain a fourth equation G3=b2;

substituting the coordinates of the point 3 into Formula (2) to obtain a fifth equation:

$$y3=d2*(x3-x2)^3+c2*(x3-x2)^2+b2*(x3-x2)+a2;$$

substituting the coordinates of the point 4 into Formula (3) to obtain a sixth equation:

$$y4=d3*(x4-x3)^3+c3*(x4-x3)^2+b3*(x4-x3)+a3;$$

enabling a first derivative of Formula (3) at the point 4 to be equal to a preset first derivative G4 of the point 4 to obtain a seventh equation:

$$G4=d3*3(x4-x3)^2+c3*(x4-x3)+b3;$$

enabling a first derivative of Formula (2) at the point 3 to be equal to a first derivative of Formula (3) at the point 3 to obtain an eighth equation:

$$d2*3(x3-x2)^2+c2*(x3-x2)+b2=b3;$$

enabling a second derivative of Formula (2) at the point 3 to be equal to a second derivative of Formula (3) at the point 3 to obtain a ninth equation:

$$d2*6(x3-x2)+c2=0; \text{ and}$$

combining the foregoing equations to obtain the third coefficient c2 and the fourth coefficient d2 of the second mapping curve, and the second coefficient b3, the third coefficient c3, and the fourth coefficient d3 of the third mapping curve; generating the second mapping curve based on the first coefficient a2, the second coefficient b2, the third coefficient c2, and the fourth coefficient d2 of the second mapping curve; and generating the third mapping curve based on the first coefficient a3, the second coefficient b3, the third coefficient c3, and the fourth coefficient d3 of the third mapping curve.

S703: Perform tone mapping on the at least one frame of image based on the M mapping curves.

In a possible embodiment, the performing tone mapping on the at least one frame of image based on the M mapping curves includes: performing tone mapping on each pixel in the at least one frame of image by using a mapping curve corresponding to a luminance range of the pixel.

For example, luminance of the first image is divided into the low luminance range, the medium luminance range, and the high luminance range. The low luminance range is further divided into two luminance sub-ranges, and each luminance sub-range corresponds to one mapping curve. If luminance of a pixel A in the first image belongs to the first luminance sub-range, mapping is performed on the pixel based on a mapping curve corresponding to the first luminance sub-range.

It can be learned from the foregoing descriptions that, in this embodiment of this application, the backend device generates the mapping curve based on feature parameters of the mapping curve included in the metadata, and performs tone mapping on pixels in different luminance ranges of the HDR image by using different mapping curves, so that display adaptation of the HDR image can be performed, and display effect of the HDR image can be effectively improved.

In a possible embodiment, the metadata may further include color information of the at least one frame of image. After the backend device performs tone mapping on the at least one frame of image based on the M mapping curves, the method further includes: correcting color information of at least one frame of image obtained through mapping based on luminance information of each pixel in the at least one frame of image before and after tone mapping.

It should be understood that the metadata may further include color attribute information (for example, color saturation adjustment intensity) of the at least one frame of image. Correspondingly, the backend device may further correct the color information of the at least one frame of image obtained through mapping based on the color attribute information and the luminance information of each pixel in the at least one frame of image before and after tone mapping.

For example, the pixel A in the at least one frame of image is used as an example. The backend device may determine a ratio of a first luminance value obtained after tone mapping is performed on the pixel A to a second luminance value obtained before tone mapping is performed on the pixel A, determine a saturation adjustment factor based on the ratio, a maximum display capability of a target display device in the backend device, a maximum display capability of a reference display device (for example, a video production device) in the frontend device, the color attribute information of the at least one frame of image, and a second luminance value before tone mapping of the pixel A, and adjust color information of the pixel A based on the saturation adjustment factor. The maximum display capability may be understood as a maximum display luminance value.

It should be understood that the color information may be a YUV signal or a color signal in another form. This is not specifically limited in this embodiment of this application. Yin "YUV" is used to represent luminance information of an image, and UV is used to represent color information of the image.

In a possible implementation, the color information is the YUV signal, and the backend device can correct the color information by multiplying the saturation adjustment factor by a UV component of each pixel in the at least one frame of image obtained through tone mapping.

In this embodiment, the backend device adjusts the color information of the at least one frame of image based on the luminance information of each pixel in the at least one frame of image before and after tone mapping, the display capability of the target display device in the backend device, the maximum display capability of the reference display device in the frontend device, and the color attribute information of the at least one frame of image. This can obtain good correction effect, and further obtain good display effect.

Based on a same technical concept, an embodiment of this application further provides a tone mapping apparatus 800. The apparatus 800 has a function of implementing the backend device in FIG. 2A. The function, unit, or means may be implemented by software, may be implemented by hardware, or may be implemented by hardware executing corresponding software.

Figure 8:
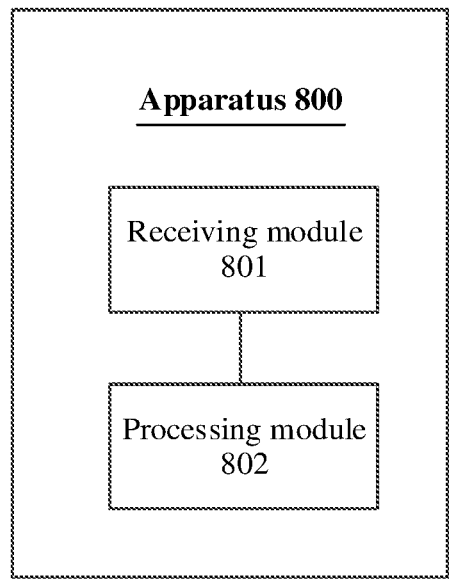
FIG. 8 is a schematic diagram of a structure of a tone mapping apparatus according to an embodiment of this disclosure.

For example, refer to FIG. 8. The apparatus 800 may include:
a receiving module 801, configured to receive at least one frame of image and metadata, where the metadata includes a quantity M of mapping curves and coordinates of a start node and an end node of each mapping curve in a first coordinate system, the mapping curve is an N-power spline curve, a horizontal coordinate of the first coordinate system indicates image luminance before tone mapping, a vertical coordinate of the first coordinate system indicates image luminance after tone mapping, M is an integer greater than or equal to 1, and N is an integer greater than or equal to 3; and
a processing module 802, configured to generate the M mapping curves based on the metadata, where
the processing module 802 is further configured to perform tone mapping on the at least one frame of image based on the M mapping curves.

It should be understood that all related content of the steps in the foregoing embodiment of the tone mapping method may be cited in function descriptions of corresponding function modules, and details are not described herein again.

Based on a same technical concept, an embodiment of this application further provides a metadata generation apparatus 900. The apparatus 900 has a function of implementing the frontend device in FIG. 2A. For example, the function, unit, or means may be implemented by software, implemented by hardware, or may be implemented by hardware executing corresponding software.

Figure 9:
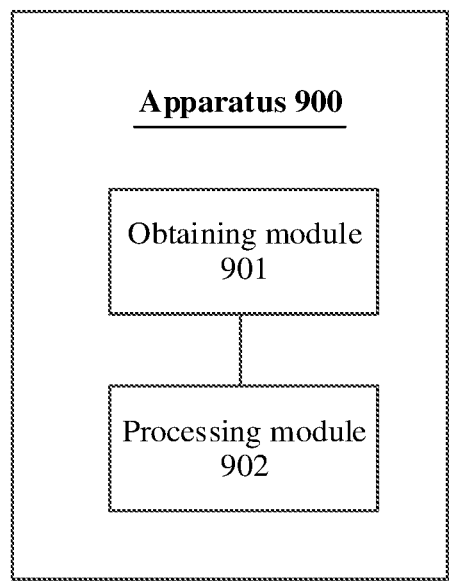
FIG. 9 is a schematic diagram of a structure of a metadata generation apparatus according to an embodiment of this disclosure.

For example, refer to FIG. 9. The apparatus 900 may include:
an obtaining module 901, configured to obtain at least one frame of image; and
a processing module 902, configured to process the at least one frame of image to generate metadata, where the metadata includes a quantity M of mapping curves and coordinates of a start node and an end node of each mapping curve in a first coordinate system, the mapping curve is an N-power spline curve, a horizontal coordinate of the first coordinate system indicates image luminance before tone mapping, a vertical coordinate of the first coordinate system indicates image luminance after tone mapping, M is an integer greater than or equal to 1, and N is an integer greater than or equal to 3.

It should be understood that all related content of the steps in the foregoing embodiment of the metadata generation method may be cited in function descriptions of corresponding function modules, and details are not described herein again.

Based on a same technical concept, an embodiment of this application further provides a computer-readable storage medium, including a program or instructions. When the program or the instructions are run on a computer, the method performed by the frontend device or the backend device in the embodiment shown in FIG. 2A is performed.

Based on a same technical concept, an embodiment of this application further provides an electronic device 1000, configured to implement the metadata generation method in the embodiment shown in FIG. 3A.

Figure 10:
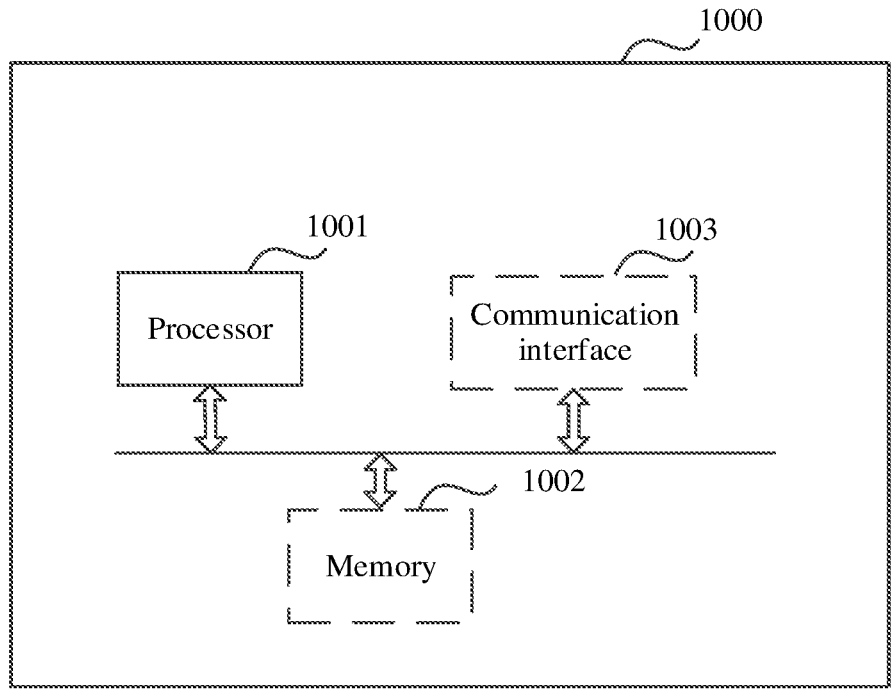
FIG. 10 is a schematic diagram of a structure of an electronic device according to an embodiment of this disclosure.

As shown in FIG. 10, the electronic device 1000 may include a processor 1001 configured to execute a program or instructions stored in a memory 1002. When the program or the instructions stored in the memory 1002 are executed, the processor 1001 is configured to perform the tone mapping method in the embodiment shown in FIG. 3A.

Optionally, the electronic device 1000 may further include a communication interface 1003. FIG. 10 shows, with dashed lines, that the communication interface 1003 is optional for the electronic device 1000.

A quantity of processors 1001, a quantity of memories 1002, and a quantity of communication interfaces 1003 do not constitute limitations on this embodiment of this application, and during specific implementation, may be randomly configured based on a service requirement.

Optionally, the memory 1002 is located outside the electronic device 1000.

Optionally, the electronic device 1000 includes the memory 1002. The memory 1002 is connected to at least one processor 1001, and the memory 1002 stores instructions that can be executed by the at least one processor 1001. FIG. 10 shows, with dashed lines, that the memory 1002 is optional for the electronic device 1000.

The processor 1001 and the memory 1002 may be coupled through an interface circuit, or may be integrated together. This is not limited herein.

A specific connection medium between the processor 1001, the memory 1002, and the communication interface 1003 is not limited in this embodiment of this application. In this embodiment of this application, the processor 1001, the memory 1002, and the communication interface 1003 are connected through a bus 1004 in FIG. 10. The bus is represented by a bold line in FIG. 10. A connection manner between other components is merely an example for description, and is not limited thereto. The bus may be classified into an address bus, a data bus, a control bus, and the like. For ease of representation, only one bold line is used to represent the bus in FIG. 10, but this does not mean that there is only one bus or only one type of bus.

Based on a same technical concept, an embodiment of this disclosure further provides an electronic device 1100, configured to implement the tone mapping method in the embodiment shown in FIG. 7.

Figure 11:
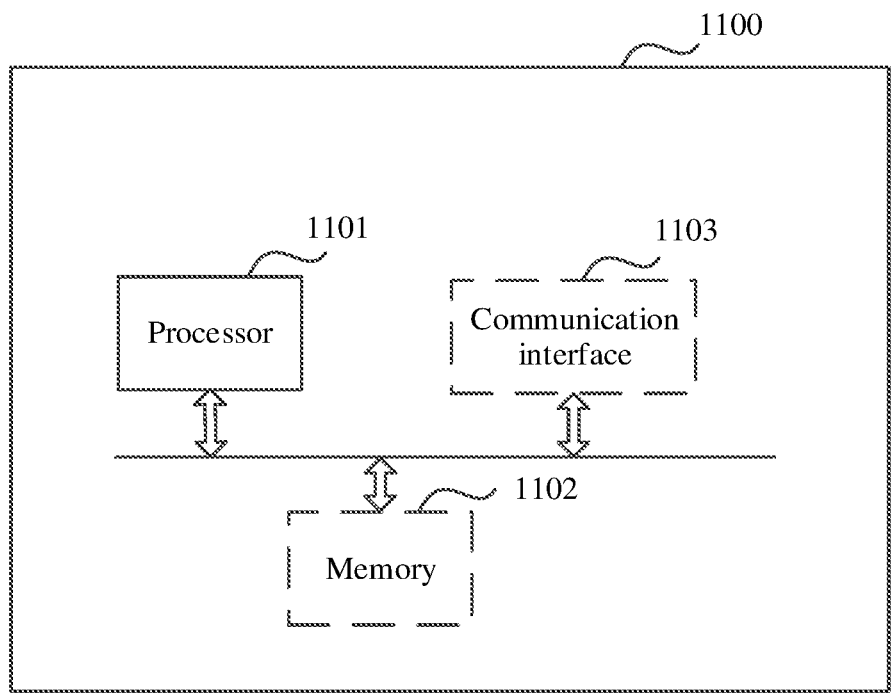
FIG. 11 is a schematic diagram of a structure of another electronic device according to an embodiment of this disclosure.

As shown in FIG. 11, the electronic device 1100 may include a processor 1101 configured to execute a program or instructions stored in a memory 1102. When the program or the instructions stored in the memory 1102 are executed, the processor is configured to perform the tone mapping method in the embodiment shown in FIG. 7.

Optionally, the electronic device 1100 may further include a communication interface 1103. FIG. 11 shows, with dashed lines, that the communication interface 1103 is optional for the electronic device 1100.

A quantity of processors 1101, a quantity of memories 1102, and a quantity of communication interfaces 1103 do not constitute limitations on this embodiment of this application, and during specific implementation, may be randomly configured based on a service requirement.

Optionally, the memory 1102 is located outside the electronic device 1100.

Optionally, the electronic device 1100 includes the memory 1102. The memory 1102 is connected to at least one processor 1101, and the memory 1102 stores instructions that can be executed by the at least one processor 1101. FIG. 11 shows, with dashed lines, that the memory 1102 is optional for the electronic device 1100.

The processor 1101 and the memory 1102 may be coupled through an interface circuit, or may be integrated together. This is not limited herein.

A specific connection medium between the processor 1101, the memory 1102, and the communication interface 1103 is not limited in this embodiment. In this embodiment, the processor 1101, the memory 1102, and the communication interface 1103 are connected through a bus 1104 in FIG. 11. The bus is represented by a bold line in FIG. 11. A connection manner between other components is merely an example for description, and is not limited thereto. The bus may be classified into an address bus, a data bus, a control bus, and the like. For ease of representation, only one bold line is used to represent the bus in FIG. 11, but this does not mean that there is only one bus or only one type of bus.

It should be understood that the processor in the disclosed embodiments may be implemented by hardware or may be implemented by software. When the processor is implemented by the hardware, the processor may be a logic circuit, an integrated circuit, or the like. When the processor is implemented by the software, the processor may be a general-purpose processor, and is implemented by reading software code stored in the memory.

For example, the processor may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example, and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (storage module) may be integrated into the processor.

It should be noted that the memory described in this specification aims to include but is not limited to these memories and any memory of another proper type.

A person skilled in the art should understand that embodiments of this disclosure may be provided as a method, a system, or a computer program product. Therefore, this disclosure may use a form of hardware only embodiments, software only embodiments, or embodiments with a combination of software and hardware. In addition, this disclosure may use a form of a computer program product that is implemented on one or more computer-usable storage media (including but not limited to a disk memory, a CD-ROM, an optical memory, and the like) that include computer-usable program code.

Embodiments are described with reference to the flowcharts and/or block diagrams of the method, the device (system), and the computer program product according to this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by the computer or the processor of the any other programmable data processing device generate an apparatus for implementing a specific function in one or more processes in the flowcharts and/or in one or more blocks in the block diagrams.

These computer program instructions may alternatively be stored in a computer-readable memory that can instruct a computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, and computer-implemented processing is generated. Therefore, the instructions executed on the computer or the another programmable device provide steps for implementing a specific function in one or more processes in the flowcharts and/or in one or more blocks in the block diagrams.

A person skilled in the art can make various modifications and variations to this disclosure without departing from its spirit and scope. This disclosure is intended to cover these modifications and variations to the extent that they fall within the scope of protection defined by the following claims.

What is claimed is:

1. A tone mapping method, comprising:
    receiving at least one frame of image and metadata, the metadata comprising data corresponding to a quantity M of mapping curves and coordinates of a start node and an end node for each mapping curve in a first coordinate system, each mapping curve being an N-power spline curve, a horizontal coordinate of the first coordinate system indicating image luminance before tone mapping, a vertical coordinate of the first coordinate system indicating image luminance after tone mapping, M being an integer greater than or equal to 1, and N being an integer greater than or equal to 3, the metadata further comprising a preset first derivative of the start node and a preset first derivative of the end node of each mapping curve;
    generating the M mapping curves based on the metadata;
    performing tone mapping on the at least one frame of image based on the M mapping curves, wherein:
        each of the at least one frame of image corresponds to at least one luminance range, each luminance range corresponds to at least one mapping curve, a function expression corresponding to each mapping curve being an N-power polynomial comprising N+1 monomials, each monomial corresponding to one coefficient; and
        a first function expression corresponding to an $i^{th}$ mapping curve in the at least one mapping curve is:

$$y = di*(x-x2)^3 + ci*(x-x2)^2 + bi*(x-x2) + ai, \text{ wherein:}$$

x is an independent variable and represents the image luminance before tone mapping, y is a dependent variable and represents the image luminance after tone mapping, ai is a first coefficient of a constant term in the $i^{th}$ mapping curve, bi is a second coefficient of a linear monomial in the $i^{th}$ mapping curve, ci is a third coefficient of a quartic monomial in the $i^{th}$ mapping curve, di is a fourth coefficient of a cubic monomial in the $i^{th}$ mapping curve, x2 is a horizontal coordinate of a start node of the $i^{th}$ mapping curve, and none of ai, bi, ci, and di is 0.

2. The method according to claim 1, wherein the metadata further comprises a preset first derivative of the start node and a preset first derivative of the end node of each mapping curve.

3. The method according to claim 1, wherein a first luminance range in the at least one luminance range corresponds to a first mapping curve, and the first mapping curve comprises a first start node and a first end node; and
    the generating the M mapping curves based on the metadata comprises:
        substituting coordinates of the first start node into the first function expression to obtain a first coefficient a1 of the first mapping curve;
        substituting coordinates of the first end node into the first function expression to obtain a first equation;
        enabling a first derivative of the first mapping curve at the first start node to be equal to a preset first derivative of the first start node to obtain a second equation;
        enabling a first derivative of the first mapping curve at the first end node to be equal to a preset first derivative of the first end node to obtain a third equation;
        combining the first equation, the second equation, and the third equation to obtain a first system of equations;
        parsing the first system of equations to obtain a second coefficient b1, a third coefficient c1, and a fourth coefficient d1 of the first mapping curve; and
        generating the first mapping curve based on the first coefficient a1, the second coefficient b1, the third coefficient c1, and the fourth coefficient d1 of the first mapping curve.

4. The method according to claim 1, wherein:
    a second luminance range in the at least one luminance range corresponds to a second mapping curve and a third mapping curve, the second mapping curve corresponding to a first luminance sub-range in the second luminance range, the third mapping curve corresponding to a second luminance sub-range in the second luminance range, and a maximum value in the first luminance sub-range being equal to a minimum value in the second luminance sub-range;
    the second mapping curve comprising a second start node and a second end node; the third mapping curve comprising a third start node and a third end node; and coordinates of the second end node are the same as coordinates of the third start node; and
    the generating the M mapping curves based on the metadata comprises:
        substituting coordinates of the second start node into the first function expression to obtain a first coefficient a2 of the second mapping curve;
        substituting the coordinates of the third start node into the first function expression to obtain a first coefficient a3 of the third mapping curve;
        enabling a first derivative of the second mapping curve at the second start node to be equal to a preset first derivative of the second start node to establish a fourth equation; and parsing the fourth equation to obtain a second coefficient b2 of the second mapping curve;

constructing a second system of equations based on the coordinates of the second end node, coordinates of the third end node, and a preset first derivative of the third end node;

parsing the second system of equations to obtain a third coefficient c2 and a fourth coefficient d2 of the second mapping curve, and a second coefficient b3, a third coefficient c3, and a fourth coefficient d3 of the third mapping curve;

generating the second mapping curve based on the first coefficient a2, the second coefficient b2, the third coefficient c2, and the fourth coefficient d2 of the second mapping curve; and generating the third mapping curve based on the first coefficient a3, the second coefficient b3, the third coefficient c3, and the fourth coefficient d3 of the third mapping curve.

5. The method according to claim 4, wherein the constructing a second system of equations based on the coordinates of the second end node, coordinates of the third end node, and a preset first derivative of the third end node comprises:

substituting the coordinates of the second end node and the coordinates of the third end node into the first function expression to obtain a fifth equation and a sixth equation respectively, and enabling a first derivative of the third mapping curve at the third start node to be equal to the preset first derivative of the third end node to obtain a seventh equation;

enabling a first derivative of the second mapping curve at the second end node to be equal to the first derivative of the third mapping curve at the third start node to obtain an eighth equation, and enabling a second derivative of the second mapping curve at the second end node to be equal to a second derivative of the third mapping curve at the third start node to obtain a ninth equation; or enabling a first derivative of the second mapping curve at the second end node to be equal to a preset first derivative of the second end node to obtain an eighth equation, and enabling the first derivative of the third mapping curve at the third start node to be equal to a preset first derivative of the third start node to obtain a ninth equation; and combining the fifth equation, the sixth equation, the seventh equation, the eighth equation, and the ninth equation to obtain the second system of equations.

6. The method according to claim 2, wherein the performing tone mapping on the at least one frame of image based on the M mapping curves comprises:

performing tone mapping on each pixel in the at least one frame of image by using a mapping curve corresponding to a luminance range of the pixel.

7. The method according to claim 2, further comprising:

correcting, based on luminance information of each pixel in the at least one frame of image before and after tone mapping, color information of at least one frame of image obtained through tone mapping.

8. A metadata generation method, comprising:

obtaining at least one frame of image; and processing the at least one frame of image to generate metadata, the metadata comprising a quantity M of mapping curves and coordinates of a start node and an end node of each mapping curve in a first coordinate system, the mapping curve being an N-power spline curve, a horizontal coordinate of the first coordinate system indicating image luminance before tone mapping, a vertical coordinate of the first coordinate system indicates image luminance after tone mapping, M being an integer greater than or equal to 1, and N being an integer greater than or equal to 3;

generating the M mapping curves based on the metadata;

performing tone mapping on the at least one frame of image based on the M mapping curves, wherein:

each of the at least one frame of image corresponds to at least one luminance range, each luminance range corresponds to at least one mapping curve, a function expression corresponding to each mapping curve being an N-power polynomial comprising N+1 monomials, each monomial corresponding to one coefficient; and a first function expression corresponding to an $i^{th}$ mapping curve in the at least one mapping curve is:

$$y = di*(x-x2)^3 + ci*(x-x2)^2 + bi*(x-x2) + ai, \text{ wherein:}$$

x is an independent variable and represents the image luminance before tone mapping, y is a dependent variable and represents the image luminance after tone mapping, ai is a first coefficient of a constant term in the $i^{th}$ mapping curve, bi is a second coefficient of a linear monomial in the $i^{th}$ mapping curve, ci is a third coefficient of a quartic monomial in the $i^{th}$ mapping curve, di is a fourth coefficient of a cubic monomial in the $i^{th}$ mapping curve, x2 is a horizontal coordinate of a start node of the $i^{th}$ mapping curve, and none of ai, bi, ci, and di is 0.

9. The method according to claim 8, wherein the processing the at least one frame of image to generate metadata comprises:

extracting attribute information of the at least one frame of image, the attribute information comprising a maximum value, a minimum value, an average value, and a change range of luminance; and determining the metadata based on the attribute information.

10. The method according to claim 9, wherein the determining the metadata based on the attribute information comprises:

determining a luminance distribution status of the at least one frame of image based on the attribute information;

dividing the luminance of the at least one frame of image into at least one luminance range based on the luminance distribution status; and determining the quantity M based on a quantity F of luminance ranges, wherein M is greater than or equal to F, and each luminance range corresponds to at least one mapping curve.

11. The method according to claim 9, wherein the determining the metadata based on the attribute information comprises:

determining coordinates of a start node and an end node of each mapping curve in the first coordinate system based on the luminance distribution status and a maximum luminance value that can be displayed by a backend device.

12. The method according to claim 9, wherein the metadata further comprises a preset first derivative of the start node and a preset first derivative of the end node.

13. The method according to claim 12, wherein the determining the metadata based on the attribute information comprises:

determining the preset first derivative of the start node and the preset first derivative of the end node based on a balance requirement between the luminance and contrast of the at least one frame of image.

14. The method according to claim 13, further comprising:
performing a first operation to change at least one of the quantity M, the coordinates of the start node in the first coordinate system, the coordinates of the end node in the first coordinate system, the preset first derivative of the start node, or the preset first derivative of the end node; and
modifying the metadata based on the first operation to obtain updated metadata.

15. An electronic device, comprising nonvolatile memory and at least one processor coupled to the memory, the memory storing program code that, when executed by the processor, causes the electronic device to perform operations including:
receiving at least one frame of image and metadata, the metadata comprising a quantity M of mapping curves and coordinates of a start node and an end node of each mapping curve in a first coordinate system, the mapping curve being an N-power spline curve, a horizontal coordinate of the first coordinate system indicating image luminance before tone mapping, a vertical coordinate of the first coordinate system indicating image luminance after tone mapping, M being an integer greater than or equal to 1, and N being an integer greater than or equal to 3;
generating the M mapping curves based on the metadata;
performing tone mapping on the at least one frame of image based on the M mapping curves, wherein:
each of the at least one frame of image corresponds to at least one luminance range, each luminance range corresponds to at least one mapping curve, a function expression corresponding to each mapping curve being an N-power polynomial comprising N+1 monomials, each monomial corresponding to one coefficient; and
a first function expression corresponding to an $i^{th}$ mapping curve in the at least one mapping curve is:

$y = di*(x-x2)^3 + ci*(x-x2)^2 + bi*(x-x2) + ai$, wherein:

x is an independent variable and represents the image luminance before tone mapping, y is a dependent variable and represents the image luminance after tone mapping, ai is a first coefficient of a constant term in the $i^{th}$ mapping curve, bi is a second coefficient of a linear monomial in the $i^{th}$ mapping curve, ci is a third coefficient of a quartic monomial in the $i^{th}$ mapping curve, di is a fourth coefficient of a cubic monomial in the $i^{th}$ mapping curve, x2 is a horizontal coordinate of a start node of the $i^{th}$ mapping curve, and none of ai, bi, ci, and di is 0.

16. The electronic device according to claim 15, wherein a first luminance range in the at least one luminance range corresponds to a first mapping curve, and the first mapping curve comprises a first start node and a first end node; and
the generating the M mapping curves based on the metadata comprises:
substituting coordinates of the first start node into the first function expression to obtain a first coefficient a1 of the first mapping curve;
substituting coordinates of the first end node into the first function expression to obtain a first equation;
setting a first derivative of the first mapping curve at the first start node to be equal to a preset first derivative of the first start node to obtain a second equation;
setting a first derivative of the first mapping curve at the first end node to be equal to a preset first derivative of the first end node to obtain a third equation;
combining the first equation, the second equation, and the third equation to obtain a first system of equations;
parsing the first system of equations to obtain a second coefficient b1, a third coefficient c1, and a fourth coefficient d1 of the first mapping curve; and
generating the first mapping curve based on the first coefficient a1, the second coefficient b1, the third coefficient c1, and the fourth coefficient d1 of the first mapping curve.

\* \* \* \* \*